United States Patent
Tjhang et al.

(10) Patent No.: US 9,584,711 B2
(45) Date of Patent: Feb. 28, 2017

(54) IMAGING METHODS AND SYSTEMS FOR CONTROLLING EQUIPMENT IN REMOTE ENVIRONMENTS

(75) Inventors: Theodorus Tjhang, Sagamihara (JP); Masatoshi Ishikawa, Bunkyo-ku (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 692 days.

(21) Appl. No.: 13/439,824

(22) Filed: Apr. 4, 2012

(65) Prior Publication Data

US 2013/0265409 A1    Oct. 10, 2013

(51) Int. Cl.
  *H04N 7/18*    (2006.01)
  *H04N 5/232*   (2006.01)

(52) U.S. Cl.
  CPC ..... *H04N 5/23206* (2013.01); *H04N 5/23229* (2013.01)

(58) Field of Classification Search
  None
  See application file for complete search history.

(56) References Cited

U.S. PATENT DOCUMENTS

| | | | |
|---|---|---|---|
| 6,144,761 A * | 11/2000 | Kaneko et al. | 382/154 |
| 6,518,995 B1 * | 2/2003 | Ghole | 348/82 |
| 7,114,562 B2 | 10/2006 | Fisseler et al. | |
| 7,861,784 B2 * | 1/2011 | Burleson | E21B 43/1195 166/297 |
| 2005/0161260 A1 * | 7/2005 | Koithan | E21B 44/00 175/57 |
| 2006/0114321 A1 * | 6/2006 | Kassem | 348/143 |
| 2007/0198145 A1 * | 8/2007 | Norris et al. | 701/23 |
| 2007/0296810 A1 * | 12/2007 | Vessereau | E21B 33/124 348/85 |
| 2012/0227480 A1 * | 9/2012 | Nguyen-Thuyet et al. | 73/152.02 |
| 2013/0152293 A1 * | 6/2013 | Yu | F15B 11/08 4/406 |
| 2013/0300869 A1 * | 11/2013 | Lu et al. | 348/148 |
| 2014/0218500 A1 * | 8/2014 | Narayanaswami et al. | 348/82 |

OTHER PUBLICATIONS

Masatoshi Ishikawa et al., "A CMOS Vision Chip with SIMD Processing Element Array for 1ms Image Processing", IEEE International Solid-State Circuits Conference (ISSCC 1999), Dig. Tech. Papers, pp. 206-207, 1999.

* cited by examiner

*Primary Examiner* — Frederick Bailey
(74) *Attorney, Agent, or Firm* — Trevor G. Grove

(57) ABSTRACT

Imaging methods and systems for controlling equipment in remote environments are disclosed herein. An example system disclosed herein to control equipment in a remote environment includes an imaging assembly to determine feedback data based on measurement data obtained from a plurality of remote imaging systems controllable to process different respective optical fields-of-view in the remote environment, a flushing assembly controllable to project fluid to clear the optical fields-of-view in the remote environment, and a controller to process the feedback data to determine a control signal to control operation of at least one of (1) the plurality of remote imaging systems or (2) the flushing assembly.

19 Claims, 17 Drawing Sheets

IMAGING METHODS AND SYSTEMS FOR CONTROLLING EQUIPMENT IN REMOTE ENVIRONMENTS

FIELD OF THE DISCLOSURE

This disclosure relates generally to image processing and, more particularly, to imaging methods and systems for controlling equipment in remote environments.

BACKGROUND

Many oilfield applications, such deepwater and subterranean drilling applications, rely on remote control of equipment, such as manipulators and other robotic automation, operating in remote environments. For example, in deepwater applications, remote manipulators and other robotic automation, such as a remotely operated vehicle (ROV) that is controlled from a surface ship or other location, are used to observe, monitor and/or maintain the subsea equipment and instrumentation installed on the seabed. Remote manipulators and other robotic automation are also used in other hazardous remote environments, such as in offshore and/or land-based drilling applications. For example, remote manipulators may be used to install and handle downhole drilling equipment, such as downhole tools, drilling pipes, collars, etc.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Example methods and systems disclosed herein relate generally to image processing and, more particularly, to image processing for controlling equipment in remote environments. A disclosed example system to control equipment in a remote environment includes an example imaging assembly to determine feedback data based on measurement data obtained from multiple example remote imaging systems that are controllable to process different respective optical fields-of-view in the remote environment. The example system also includes an example flushing assembly controllable to project fluid to clear the optical fields-of-view in the remote environment. The example system further includes an example controller to process the feedback data to determine a control signal to control operation of at least one of (1) the plurality of remote imaging systems or (2) the flushing assembly.

A disclosed example method to control equipment in a remote environment includes determining feedback data based on measurement data obtained from multiple example remote imaging systems that are controllable to process different respective optical fields-of-view in the remote environment. The example method also includes projecting fluid via an example controllable flushing assembly to clear the optical fields-of-view in the remote environment. The example method further includes processing the feedback data to determine a control signal to control operation of at least one of (1) the plurality of remote imaging systems or (2) the flushing assembly

BRIEF DESCRIPTION OF THE DRAWINGS

Example imaging methods and systems for controlling equipment in remote environments are described with reference to the following figures. Where possible, the same numbers are used throughout the figures to reference like features and components.

DETAILED DESCRIPTION

In the following detailed description, reference is made to the accompanying drawings, which form a part hereof, and within which are shown by way of illustration specific embodiments by which the invention may be practiced. It is to be understood that other embodiments may be utilized and structural changes may be made without departing from the scope of the disclosure.

Prior optical-based techniques for remotely controlling equipment in an oilfield environment rely on separate, high-speed communication links to convey video of the remote environment (e.g., deepwater, subsea, or subterranean environment) to the surface or other monitoring/control site. However, such prior techniques are generally impractical because a typical telemetry system for use in an oilfield environment has a relatively small bandwidth and, thus, can support just relatively low-speed data transmission for communicating the measurements to the surface. Additionally, prior optical-based techniques may require substantially continuous flushing of the optical field-of-view to enable observable video of the remote environment to be obtained. However, substantially continuous flushing of the optical field-of-view may be impractical and/or employ uneconomical quantities of flushing fluid.

Unlike these prior optical-based remote controlling systems, example imaging-based methods and systems disclosed herein are able to support advanced image processing at the remote environment such that meaningful measurement results for controlling equipment in remote environments can be determined remotely and can be reported in real-time to the surface using existing telemetry systems having relatively small bandwidths. Additionally, example imaging-based methods and systems disclosed employ flushing that is momentary (e.g., on the order of milliseconds) such that flushing of the optical field-of-view is limited to times when images are to be captured for subsequent image processing and measurement determination.

Figure 1A:
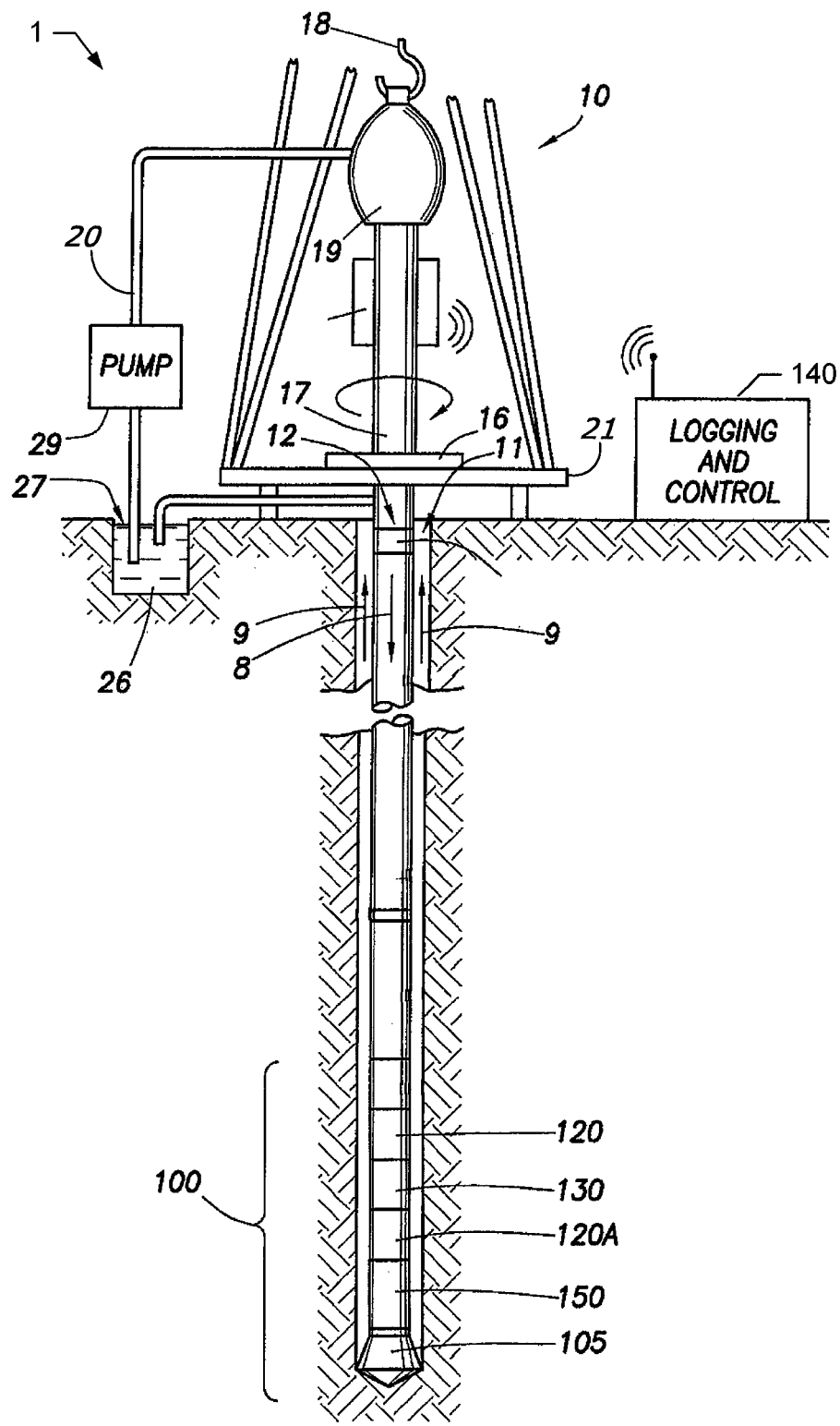
FIG. 1A is a block diagram illustrating an example wellsite system capable of supporting imaging-based remote control of equipment in remote environments as disclosed herein.

Turning to the figures, FIG. 1A illustrates an example wellsite system 1 in which the example imaging methods and systems disclosed herein for controlling equipment in remote environments can be employed. The wellsite can be onshore or offshore. In this example system, a borehole 11 is formed in subsurface formations by rotary drilling, whereas other example systems can use directional drilling.

A drillstring 12 is suspended within the borehole 11 and has a bottom hole assembly 100 that includes a drill bit 105 at its lower end. The surface system includes platform and derrick assembly 10 positioned over the borehole 11, the assembly 10 including a rotary table 16, kelly 17, hook 18 and rotary swivel 19. In an example, the drill string 12 is suspended from a lifting gear (not shown) via the hook 18, with the lifting gear being coupled to a mast (not shown) rising above the surface. An example lifting gear includes a crown block whose axis is affixed to the top of the mast, a vertically traveling block to which the hook 18 is attached, and a cable passing through the crown block and the vertically traveling block. In such an example, one end of the cable is affixed to an anchor point, whereas the other end is affixed to a winch to raise and lower the hook 18 and the drillstring 12 coupled thereto. The drillstring 12 is formed of drill pipes screwed one to another.

The drillstring 12 may be raised and lowered by turning the lifting gear with the winch. In some scenarios, drill pipe raising and lowering operations require the drillstring 12 to be unhooked temporarily from the lifting gear. In such scenarios, the drillstring 12 can be supported by blocking it with wedges in a conical recess of the rotary table 16, which is mounted on a platform 21 through which the drillstring 12 passes.

In the illustrated example, the drillstring 12 is rotated by the rotary table 16, energized by means not shown, which engages the kelly 17 at the upper end of the drillstring 12. The drillstring 12 is suspended from the hook 18, attached to a traveling block (also not shown), through the kelly 17 and the rotary swivel 19, which permits rotation of the drillstring 12 relative to the hook 18. In some examples, a top drive system could be used.

In the illustrated example, the surface system further includes drilling fluid or mud 26 stored in a pit 27 formed at the well site. A pump 29 delivers the drilling fluid 26 to the interior of the drillstring 12 via a hose 20 coupled to a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 includes one or more specially-made drill collars near the drill bit 105. Each such drill collar has one or more logging devices mounted on or in it, thereby allowing downhole drilling conditions and/or various characteristic properties of the geological formation (e.g., such as layers of rock or other material) intersected by the borehole 11 to be measured as the borehole 11 is deepened. In particular, the bottom hole assembly 100 of the illustrated example system 1 includes a logging-while-drilling (LWD) module 120, a measuring-while-drilling (MWD) module 130, a roto-steerable system and motor 150, and the drill bit 105.

The LWD module 120 is housed in a drill collar and can contain one or a plurality of logging tools. It will also be understood that more than one LWD and/or MWD module can be employed, e.g. as represented at 120A. (References, throughout, to a module at the position of 120 can mean a module at the position of 120A as well.) The LWD module 120 includes capabilities for measuring, processing, and storing information, as well as for communicating with the surface equipment.

The MWD module 130 is also housed in a drill collar and can contain one or more devices for measuring characteristics of the drillstring 12 and drill bit 105. The MWD module 130 further includes an apparatus (not shown) for generating electrical power to the downhole system. This may include a mud turbine generator powered by the flow of the drilling fluid, it being understood that other power and/or battery systems may be employed. In the illustrated example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The wellsite system 1 also includes a logging and control unit 140 communicably coupled in any appropriate manner to the LWD module 120/120A and the MWD module 130. In the illustrated example, the LWD module 120/120A and/or the MWD module 130, in conjunction with the logging and control unit 140, collectively implement an example imaging-based remote control system for controlling equipment in remote environments in accordance with the examples disclosed herein. For example, the LWD module 120/120A and/or the MWD module 130 may include a manipulator assembly to manipulate objects in the area of the LWD module 120/120A and/or the MWD module 130. The LWD module 120/120A and/or the MWD module 130 may also include imaging systems and a flushing assembly to obtain measurement data for use in controlling the manipulator assembly, as well as for controlling the imaging systems and/or flushing assembly. The LWD module 120/120A and/or the MWD module 130 may report the measurement data to the logging and control unit 140 for use in determining feedback data to be provided to one or more controllers to determine control signal(s) for controlling the manipulator assembly, imaging systems and/or flushing assembly. Example imaging-based remote control systems for controlling equipment in the example wellsite system 1 and/or for use in controlling equipment in other remote environments are described in greater detail below. Also, although some of the example imaging-based remote control systems disclosed herein are described in the context of LWD and MWD applications, the example imaging-based remote control systems are not limited thereto. Instead, imaging-based remote control as disclosed herein can also be used in other applications, such as wireline logging, production logging, permanent logging, fluid analysis, formation evaluation, sampling-while-drilling, etc.

Figure 1B:
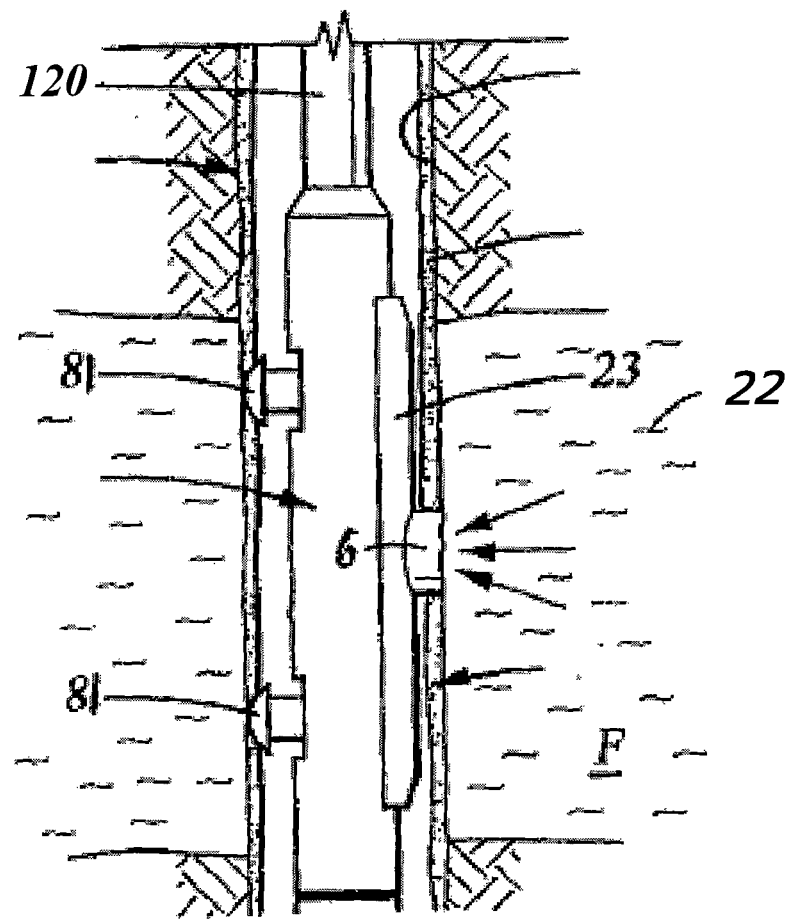
FIG. 1B is a block diagram illustrating an example sampling-while-drilling logging device capable of supporting imaging-based remote control of equipment in remote environments as disclosed herein.

For example, FIG. 1B is a simplified diagram of an example sampling-while-drilling logging device of a type described in U.S. Pat. No. 7,114,562, incorporated herein by reference, utilized as the LWD tool 120 or part of an LWD tool suite 120A, in which imaging-based remote control as disclosed herein can be used. The LWD tool 120 is provided with a probe 6 for establishing fluid communication with the formation and drawing the fluid 22 into the tool, as indicated by the arrows. The probe may be positioned in a stabilizer blade 23 of the LWD tool and extended therefrom to engage the borehole wall. The stabilizer blade 23 comprises one or more blades that are in contact with the borehole wall. Fluid drawn into the downhole tool using the probe 6 may be measured to determine, for example, pretest and/or pressure parameters. Additionally, the LWD tool 120 may be provided with devices, such as sample chambers, for collecting fluid samples for retrieval at the surface. Backup pistons 81 may also be provided to assist in applying force to push the drilling tool and/or probe against the borehole wall.

Figure 2:
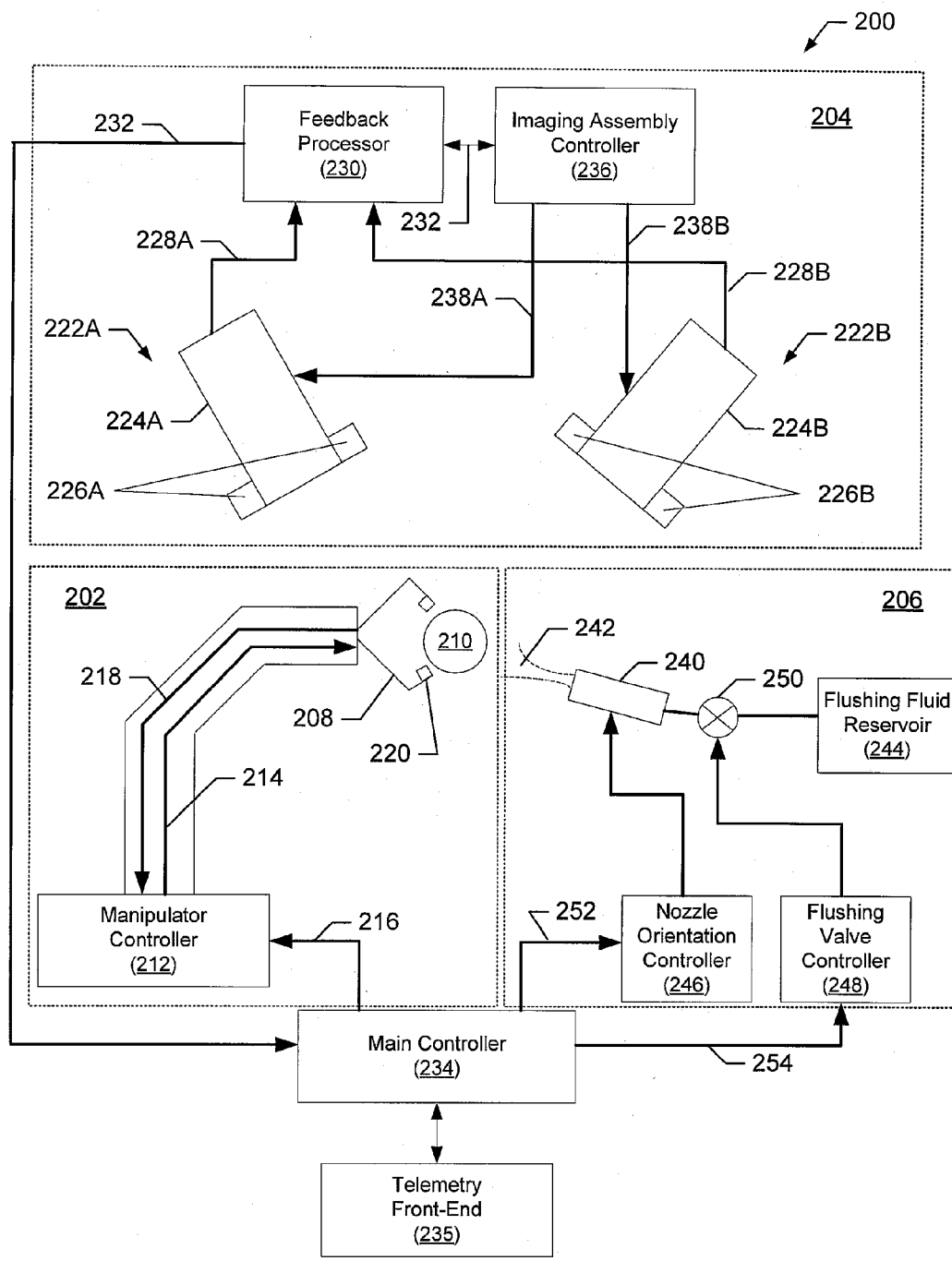
FIG. 2 is a block diagram illustrating a first example imaging-based remote control system including an example imaging assembly, an example flushing assembly and an example manipulator assembly.

An example imaging-based remote control system 200 for controlling equipment in the example wellsite system 1 of FIG. 1A, the example sampling-while-drilling logging device of FIG. 1B and/or for use in controlling equipment in other remote environments is illustrated in FIG. 2. The imaging-based remote control system 200 of the illustrated example includes an example manipulator assembly 202, an example imaging assembly 204 and an example flushing assembly 206. The manipulator assembly 202 includes an example manipulator 208, such as any type of grasping tool, fishing tool, screening tool, sampling tool, etc., for handling or otherwise manipulating an example object 210 (or multiple objects 210) in a remote environment. The manipulator assembly 202 of the illustrated example also includes an example manipulation controller 212 operatively coupled to the manipulator 208 in any appropriate manner to control operation of the manipulator 208 based on a control signal 214 derived from an externally-applied control input 216. In some examples, the manipulation controller 210 derives the control signal 212 for controlling the manipulator 208 using any appropriate combination of the externally-applied control input 214 and local sensor feedback 218 obtained from one or more example sensors 220, such as one or more tactile sensors, contact sensors, etc.

The imaging assembly 204 of the illustrated example includes two (or more) example imaging systems 222A-B. The imaging systems 222A-B include respective example imaging devices 224A-B and example light sources 226A-B to generate respective example imaging measurement signals 228A-B to be provided to an example feedback processor 230. The imaging devices 224A-B can be implemented by one or more positionable (e.g., movable, adjustable, rotateable, etc.) cameras, one or more positionable imaging sensors, one or more imaging processors 702 described below in conjunction with FIG. 7, etc. In the illustrated example, the feedback processor 230 processes the measurement signals 228A-B to determine one or more example feedback signals 232 for use in controlling the manipulator assembly 202, the imaging assembly 204 and the flushing assembly 206.

For example, in the system 200 of FIG. 2, the imaging systems 222A-B determine respective two-dimensional positioning data (e.g., such as location information, boundary information, etc.) for objects, such as the object 210, in their respective optical fields-of-view. This two-dimensional positioning data is included in the respective measurement signals 228A-B provided by the imaging systems 222A-B to the feedback processor 230. The feedback processor 230 then combines the two-dimensional positioning data included in the received measurement signals 228A-B using any appropriate technique to determine three-dimensional positioning data (e.g., such as location information, boundary information, etc.) for the objects, such as the object 210, including in the overlapping fields-of-view of the imaging devices 224A-B. The three-dimensional positioning data is included in the feedback signal(s) 232 output by the feedback processor 230.

In the illustrated example, the feedback signal(s) 232 are provided to an example main controller 234 for use in implementing feedback control of the manipulator assembly 202. For example, the three-dimensional positioning data included in the feedback signal(s) 232 can be processed by the main controller 234 using any appropriate feedback control algorithm to produce the externally-applied control input 216 to be applied to the manipulation controller 212 to control the manipulator 208. In some examples, the main controller 234 also reports the three-dimensional positioning data (and/or any other data) included in the feedback signal (s) 232 to a remote receiver on the surface via an example telemetry front-end 235 communicatively coupling the main controller 234 to a telemetry communications link (not shown).

In the illustrated example, the feedback signal(s) 232 are also provided to an example imaging assembly controller 236 for use in implementing feedback control of the imaging systems 222A-B included in the imaging assembly 204. For example, the three-dimensional positioning data included in the feedback signal(s) 232 can be processed by the imaging assembly controller 236 using any appropriate feedback control algorithm to produce respective control signals 238A-B to control the orientation (e.g., angle, focal length, etc.) of the imaging systems 222A-B. For example, the control signals 238A-B can be used to adjust the optical fields-of-view of the positionable imaging devices 224A-B, thereby enabling images of the target object 210 to be captured at appropriate angles. Additionally or alternatively, the control signals 238A-B can be used to adjust the orientation, intensity, etc., of the positionable light sources 226A-B illuminating the respective fields-of-view of the imaging systems 222A-B.

In the illustrated example system 200, the feedback signal (s) 232 are also provided to the main controller 234 for use in implementing feedback control of the flushing assembly 206. The flushing assembly 206 is included in the imaging-based remote control system 200 project flushing fluid for many purposes, such as, but are not limited to, cleaning the optical fields-of-view of the imaging systems 222A-B (e.g., which may contain an opaque fluid), cleaning the optics (e.g., windows, lenses, etc.) of the imaging devices 224A-B, cleaning the surface of the object(s) 210, etc. The example flushing assembly 206 of FIG. 2 includes an example nozzle 240 to project example flushing fluid 242. In some examples, the flushing fluid is obtained from an example flushing fluid reservoir 244. The flushing fluid can be, for example, air (e.g., oxygen), nitrogen, water or some other substantially transparent fluid, etc.

In the illustrated example of FIG. 2, the flushing assembly 206 also includes an example nozzle orientation controller 246, an example valve controller 248 and an example valve 250. The nozzle orientation controller 246 of the illustrated example controls the orientation (e.g., direction) of the nozzle 240 to cause the flushing fluid 242 to be projected (e.g., jet flushed) at the object(s) 210 and/or other desired location(s) at the appropriate angle(s) to achieve desired cleaning. As such, in the illustrated example, the main controller 234 processes the three-dimensional positioning data included in the feedback signal(s) 232 using any appropriate feedback control algorithm to produce a control signal 252 to control the nozzle orientation controller 246 and, thus, the nozzle 240 to cause the flushing fluid 242 to be projected at the position of the object(s) 210.

The flushing valve controller 248 of the illustrated example controls the times at which the valve 250 is opened and closed to control that times and durations of flushing fluid projection by the nozzle 240. Unlike in prior systems in which the flushing fluid is projected continuously (or substantially continuously), the flushing valve controller 248 and valve 250 enable the flushing fluid 242 to be projected momentarily (e.g., on the order of milliseconds) at times when the imaging systems 222A-B are capturing imaging data for their respective fields of view. As such, in some examples, the measurement data 228A-B provided by the imaging systems 222A-B includes timing data indicating times (and durations) corresponding to when the imaging devices 224A-B are to capture respective imaging data corresponding to their respective optical fields-of-view. This timing data can be included in the feedback signal(s) 232 output by the feedback processor 230 and provided to the main controller 234. In such examples, timing data included in the feedback signal(s) 232 can be processed by the main controller 234 using any appropriate feedback control algorithm to produce a control signal 254 to control the flushing valve controller 248 and, thus, cause the valve 250 to permit the flushing fluid 242 to be projected by the nozzle 240 at the appropriate time(s) and for the appropriate duration(s).

Figure 3:
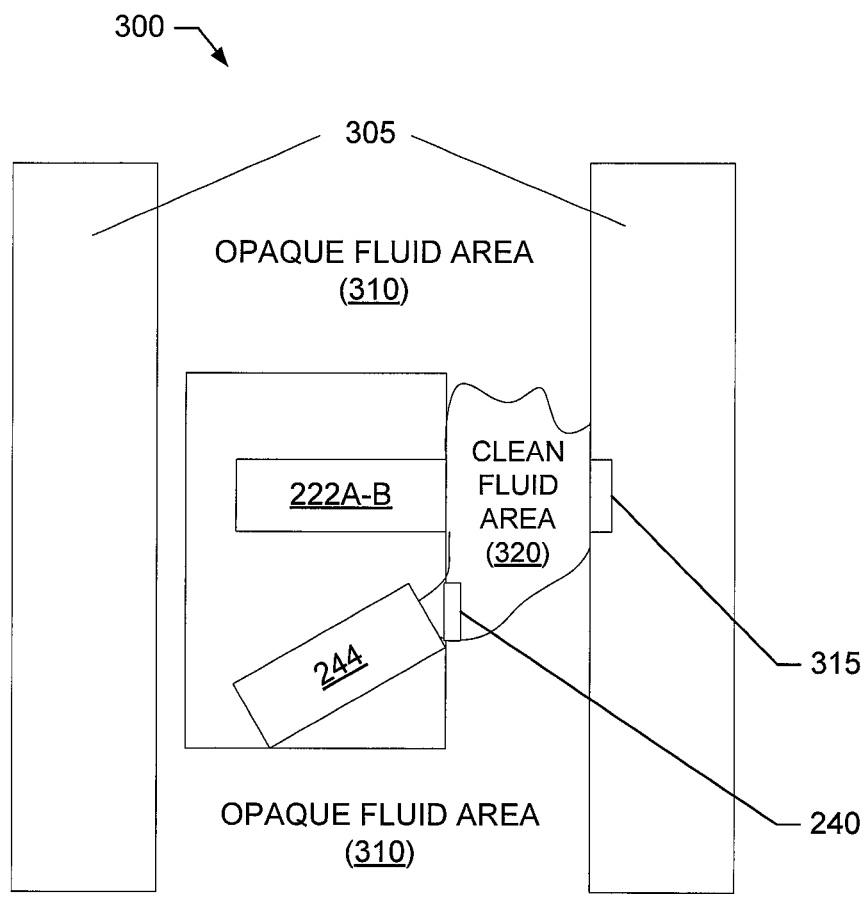
FIG. 3 is a block diagram further illustrating operation of the flushing assembly in the first example imaging-based remote control system of FIG. 2.

FIG. 3 further depicts an example operation 300 of the flushing assembly 206 in the imaging-based remote control system 200 of FIG. 2. In the illustrated example of FIG. 3, portions of the imaging-based remote control system 200, such as the imaging systems 222A-B of the imaging assembly 204, and the nozzle 240 and flushing fluid reservoir 244 of the flushing assembly 206, are located downhole in a borehole of a formation 305. The borehole contains an area of opaque fluid 310, which may include, but is not limited to, drilling fluid, mud, etc.

In the example operation 300, the imaging systems 222A-B are controllably positioned to capture images of an example target 315, which may correspond to the object(s) 210, a drilling cut sample to be examined, an unproductive reservoir region to be shielded, or any other target area of interest. To improve the quality of the images captured by the imaging systems 222A-B, the nozzle 240 of the flushing assembly 206 is controllable positioned to project flushing fluid from the flushing fluid reservoir 244 to yield an example clean fluid area 320 in the optical field-of-view of the imaging systems 222A-B. In some examples, the timing of flushing fluid projection is coordinated to coincide with when the imaging systems 222A-B are to capture images of the target 315, as described above.

In some examples, the imaging-based remote control system 200 of FIGS. 2-3 can be used to intelligently select drilling cut samples to be conveyed from the borehole by the drilling fluid. For example, a drilling cut located at the target 315 may contain rock samples of interest. The flushing fluid, which may be fresh water, chemical flushing, etc., projected by the nozzle 240 of the flushing assembly 206 can be used to clean and wash away the opaque fluid (e.g., mud) and/or dirt from the drilling cut sample(s) at the target 315. In this way, the imaging-based remote control system 200 can be used to recognize the shape and fracture characteristics of the samples, and enable feedback control of the manipulator 208 to select the samples to be conveyed from the borehole via the drilling fluid.

Although the example imaging-based remote control system 200 of FIGS. 2-3 is illustrated as including a flushing fluid reservoir 244 from which the flushing fluid 242 is to be obtained, other techniques for obtaining the flushing fluid 242 can also be employed. For example, the flushing fluid 242 can be pumped to the remote environment via coiled tubing, pumped to the remote environment via a drilling pipe, obtained locally at the remote environment via filtering of at least one of drilling fluid, completion fluid or production fluid, obtained locally at the remote environment via separation of substantially transparent fluid from at least one of drilling fluid, completion fluid or production fluid, etc.

The imaging systems 222A-B of the imaging assembly 204 included in the imaging-based remote control system 200 of FIGS. 2-3 capture images of object(s) 210 or target(s) 315 for use in determining position measurements that can be further used to implement remote feedback control of equipment to manipulate, examine, handle, etc., the object (s) 210 or target(s) 315. In some examples, the imaging systems 222A-B, or portions thereof, can be positioned downhole in a borehole or wellbore in a formation, or in a subsea or deepwater environment, or any other remote environment, to perform light sensing, image capturing and high-speed (e.g., real-time) image processing of the sensed image data locally (e.g., in the vicinity of the object(s) 210 or target(s) 315)

For example, and as described in greater detail below, each imaging system 222A-B can include a respective array of photo detectors to determine image data by sensing light in a field-of-view including the object(s) 210 or target(s) 315. In such examples, each imaging system 222A-B further includes a respective array of processing elements associated with the array of photo detectors to process the image data to determine, for example, object boundary information for an object 210, a target 315, etc. Example implementations of the imaging systems 222A-B are described in greater detail below.

In some examples, the processed image data determined by the each imaging systems 222A-B is further processed and formatted by respective example measurement processors (described in greater detail below), which are included in the imaging systems 222A-B, to determine two-dimensional positioning data (e.g., location data, object boundary data, etc.) to be reported via a communication link, such as a telemetry link, to the feedback processor 230, to the logging and control unit 140, etc., located on the surface or otherwise outside the remote environment. In such examples, the feedback processor 230 can combine the two-dimensional positioning data determined by the measurement processors of the imaging systems 222A-B to determine three-dimensional positioning data (e.g., location data, object boundary data, etc.) for the object(s) 210 or target(s) 315 in the field-of-view of the imaging systems 222A-B. Additionally or alternatively, the feedback processor 230 can process the two-dimensional positioning data received from the imaging systems 222A-B to determine a number of objects 210 in the fields-of-view, size(s) of object(s) 210 in the fields-of-view, characteristics(s) of object(s) 210 in the fields-of-view, etc., or any combination thereof.

Because the imaging systems 222A-B perform the bulk of their processing in the remote environment and report just a relatively small amount of measurement data to the surface (e.g., to the feedback processor 230 and/or the logging and control unit 140), the imaging systems 222A-B can provide high-speed, optical-based feedback control of remote equipment using a relatively low bandwidth telemetry communication link. Such a telemetry communication link can be implemented by almost any type of communication link, even existing telemetry links used today, unlike other prior optical-based remote control techniques that require high-speed communication links to transmit high-bandwidth image and/or video signals to the surface.

In some examples, the light sources 226A-B of the imaging systems 222A-B can correspond to fluorescent lighting sources. In some examples, the light sources 226A-B can provide stripe or dot pattern illumination. In some examples, the imaging systems 222A-B can support multiple light sources 226A-B with different angles of lighting and/or combinations of penetration-type lighting device(s) and/or reflection-type lighting device(s). In some examples, the imaging systems 222A-B include a light focusing device (e.g., adjustable lens, mirrors, etc.) positioned and controllable by the imaging assembly controller 236 to adjust the light emanating from the light sources 226A-B.

In some examples, the imaging systems 222A-B include one or more focal-adjustable lens to support tracking (e.g., in real-time and/or in multiple dimensions) of one or more objects 210 in the remote environment. For example, the imaging assembly controller 236 can implement an automated control loop using the positioning data included in the feedback signal(s) 232 to adjust such a focal-adjustable lens to track an object 210 in the remote environment. For example, and as described above, each imaging system 222A-B determines image data for the object 210 and processes the image data to determine two-dimensional object location and boundary information. The feedback processor 230 then uses the determined two-dimensional object location information (e.g., two-dimensional object coordinates) to determine three-dimensional object location information (e.g., three-dimensional object coordinates) that can be used by the imaging assembly controller 236 to adjust a focal length and/or an angle of an adjustable lens to track (e.g., using a feedback control loop) the motion of the object 210 in the remote environment. In some examples the imaging assembly controller 236 can adjust the adjustable lens based on commands received from the surface via a telemetry communication link (not shown), where the commands can be based on the object location information included in the feedback signals(s) 232 reported by the feedback processor 230 via the telemetry communication link.

The imaging assembly 204 can also perform a wide variety of fluid analyses, such as, but not limited to: 1) real-time bubble point detection; 2) simultaneous shown-up detection from multiple bubbles at a time; 3) water/gas holdup measurement, including simultaneous counting of multiple bubble for a production logging application; and/or 4) quantitative image measurement (e.g., fluid color, bubble size/volume, water/gas percentage in oil, etc.). In some examples, the imaging assembly 204 includes an example dye injector (not shown) to inject and enable tracking of dyes in the remote environment (e.g., to measure fluid flow). In some examples, the imaging assembly 204 can be used to observe surface conditions of the borehole, surface conditions of the casing, etc. (e.g., by sensing light reflected by the surface of the borehole, casing, etc., where the light has been emitted by a light source 226A-B positioned to illuminate the surface of the borehole, casing, etc.).

Bubble detection as performed by the imaging assembly 204 can include detection of methane hydrates-derived bubbles. The production of methane hydrate generally occurs in a low temperature environment. In this case, the downhole imaging assembly 204 (and, in particular, the imaging systems 222A-B) can be operated in a low temperature environment without any cooling devices or cooling methods.

In some examples, the manipulator 208 is positioned in a downhole borehole, inside a perforation hole, in situ inside a flow line, etc., and includes a probe to permit manipulation of object(s) 210 in the downhole borehole, inside the perforation hole, in situ inside the flow line, etc. In some examples, and as described above, each imaging system 222A-B determines image data for a respective field-of-view in the remote environment that contains the object 210 and processes the image data to determine two-dimensional object positioning data. The feedback processor 230 processes the two-dimensional object positioning data to determine three-dimensional object positioning data for the object 210, which is provided via a telemetry communication link to the main controller 234. The main controller 234 then uses the determined three-dimensional object positioning data (e.g., there-dimensional object coordinates) to command the manipulator controller 212 to adjust the manipulator 208 to the location of the object 210 in the remote environment. In some examples, the main controller 234 can further adjust the manipulator 208 based on commands received from the surface via the telemetry communication link 320, where the commands can be based on the three-dimensional object location information reported by the feedback processor 230 via the telemetry communication link.

In some examples, the imaging assembly 204 is configured to detect sand production in a drilling environment. For example, using the imaging techniques described above for object location, size and number determination, the imaging assembly 204 can detect (e.g., in real-time) the size of any sand particles in the formation fluid, and/or the quantity of the particles, to provide early sand production information to an operator. Based on such reported information, one or more preventative steps, such as installation of screening as described in greater detail below, can be taken to avoid any further sand production that can damage the well.

In some examples, the imaging assembly 204 (and, in particular, imaging systems 222A-B) can include one or more cooling devices to reduce and/or maintain devices/ assembly operating temperature. For example, the imaging systems 222A-B can include thermal electric cooler(s) to reduce the operating temperature(s) of one or more semiconductor and/or other processing devices used to implement the imaging systems 222A-B. In some examples, the imaging systems 222A-B can use other cooling mechanisms based on heat transfer methods, such as using one or more heat-sinks and/or circulating low temperature fluid around the semiconductor and/or other processing devices implementing the imaging systems 222A-B.

Figure 4A:
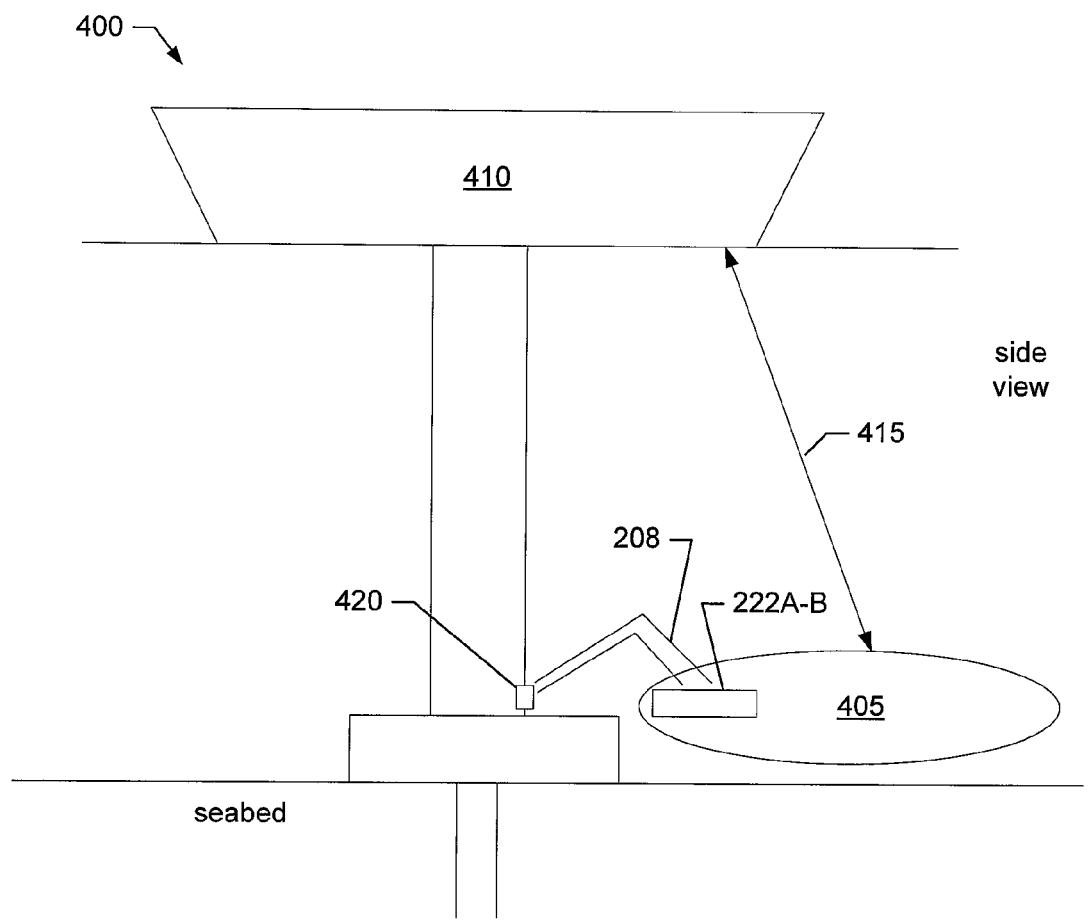
FIGS. 4A-B are block diagrams illustrating a second example imaging-based remote control system including an example remotely operated vehicle having an example manipulator that is to be controlled remotely.
Figure 4B:
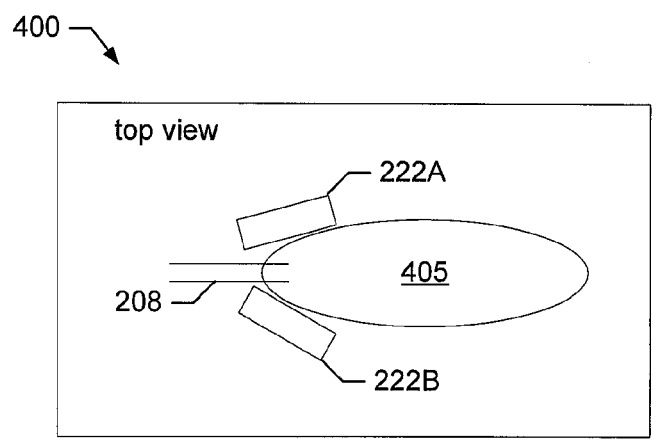

A second example imaging-based remote control system 400 including an example remotely operated vehicle (ROV) 405 having an example controlled remotely manipulator 208 for use in subsea applications is illustrated in FIGS. 4A-B. In the illustrated example, the ROV 405 can be used for oilfield equipment maintenance, construction and/or observation in deep sea environment. The system 400 of FIG. 4 includes an example telemetry communication link 415 between the ROV 405 and an example drilling ship 410 at the surface. The system 400 of the illustrated example also includes the manipulator 208 described above to manipulate a part/object at a target location 420. In the illustrated example, the imaging systems 222A-B of the imaging assembly 204 are located in the ROV to enable image-based remote control of the manipulator 208 and/or ROV 405 in accordance with the examples disclosed herein. Because the imaging systems 222A-B perform the bulk of their processing in the remote environment and report just a relatively small amount of measurement data (e.g., vector position coordinate data) to the surface ship 410, the system 400 can be used in application where the telemetry bandwidth of the link 415 is limited.

Figure 5A:
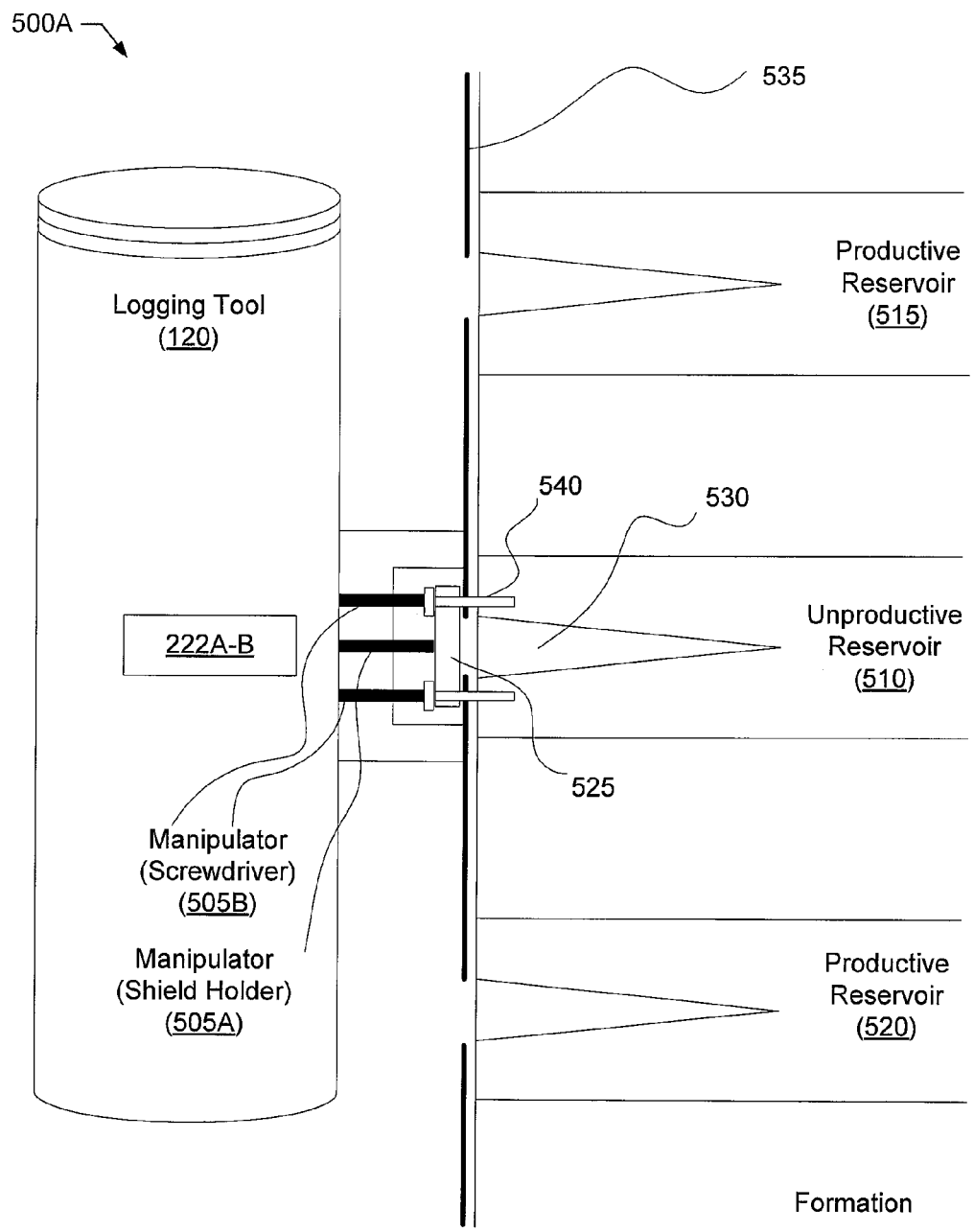
FIGS. 5A-B are block diagrams illustrating a third example imaging-based remote control system in which an example remotely controlled manipulator is included in the downhole logging tool of the example wellsite system of FIG. 1A and/or the example sampling-while-drilling logging device of FIG. 1B.
Figure 5B:
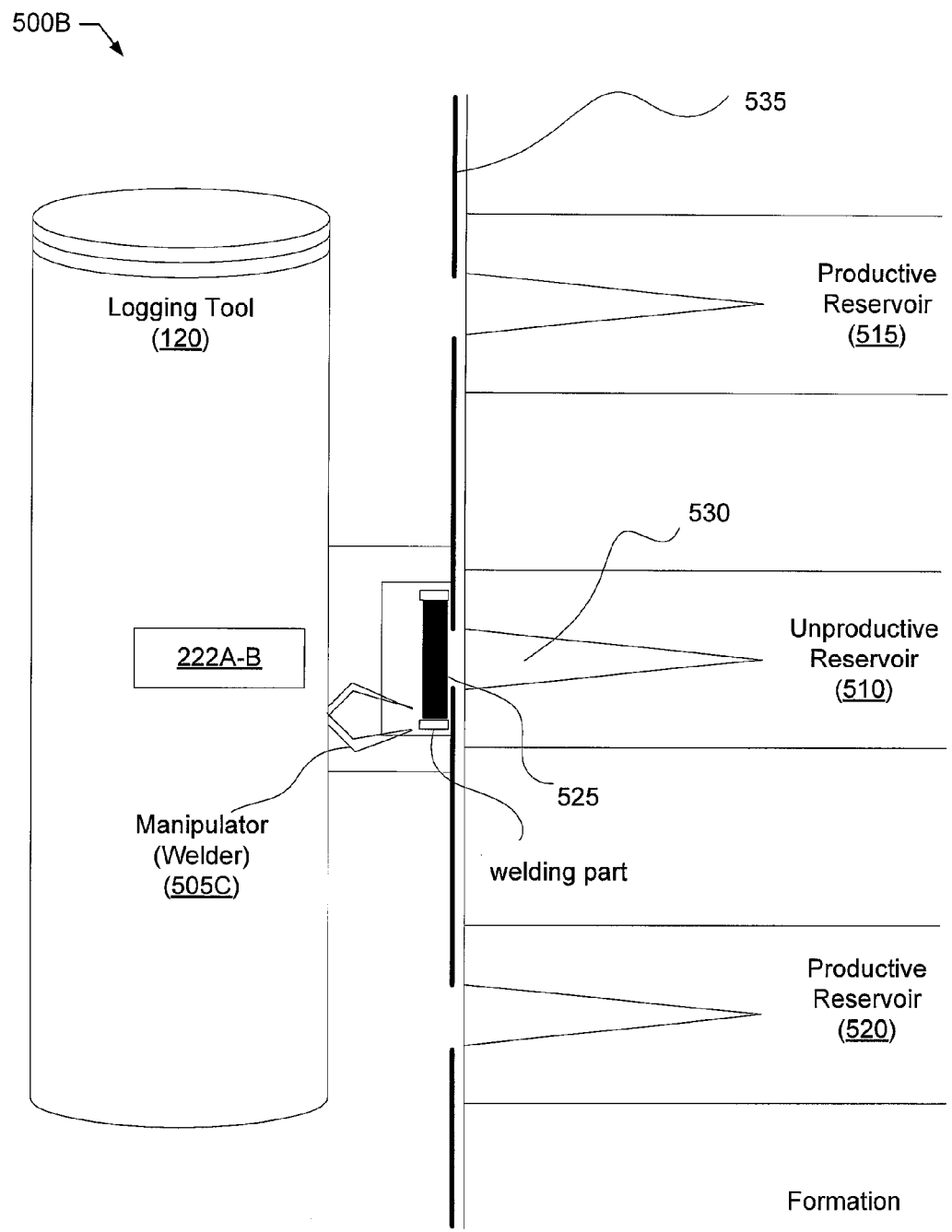

Third example imaging-based remote control systems 500A-B for use in remotely controlling example manipulators 505A-C included in the downhole logging tool 120 of the wellsite system 1 of FIG. 1A and/or the sampling-while-drilling logging device of FIG. 1B are illustrated in FIGS. 5A-B. In some oil production applications, it may be beneficial to shield a particular layer (zone) of the borehole that corresponds to an unproductive reservoir to thereby increase the total oil production rate. An unproductive reservoir, such as the example unproductive reservoir 510 of the illustrated examples, can be caused by sand production, water entry, gas entry. For example, the gas entry or water entry at the unproductive reservoir layer (zone) 510 can reduce the production of the productive reservoirs 515 and/or 520 located above or below the unproductive reservoir layer 510 because the gas or water holdup ratio will increase and thereby reduce the flow rate of oil. In prior techniques, the unproductive reservoir 510 and all reservoir layers 520 below it would need to be shielded to remove the sand, water, gas, etc., caused by the unproductive reservoir layer 510. Unlike such prior techniques, the example systems 500A-B can be used to apply an example shield 525 at just the unproductive reservoir layer 510, as illustrated in FIGS. 5A-B. As just the unproductive reservoir layer 510 is shielded, other productive reservoir layers 515 and 520 will not be shielded and, thus, can contribute to the increase of oil production.

In the illustrated examples, the imaging systems 222A-B (e.g., with illumination via the light sources 226A-B) and one or more manipulator 505A-C are installed in the logging tool 120 to allow the detection of a perforation annulus 530 and to control the manipulator(s) 505A-C to apply the perforation hole-shielding 525. For example, the system 500A of FIG. 5A includes a first manipulator 505A that implements a shield holder to hold the shield 525, and a second manipulator 505B that implements a fastening tool (e.g., such as a screwdriver) to attach the shield 525 to the casing 535 via mechanical fastener(s) 540 (e.g., such as bolt(s)). As another example, the system 500B of FIG. 5B includes a manipulator 505C that implements a welder to weld the shield 525 to the casing 535. In some examples, shape measurement can be performed by the imaging systems 222A-B and used to identify the surface shape of the casing 535 to increase the success rate of the shielding. In scenarios where opaque fluid is used or exists in the remote environment, the flushing assembly 206 can be included in the systems 505A-B to temporarily clear the optical fields-of-view of the imaging systems 222A-B to allow the shield area to be viewed clearly.

Figure 6:
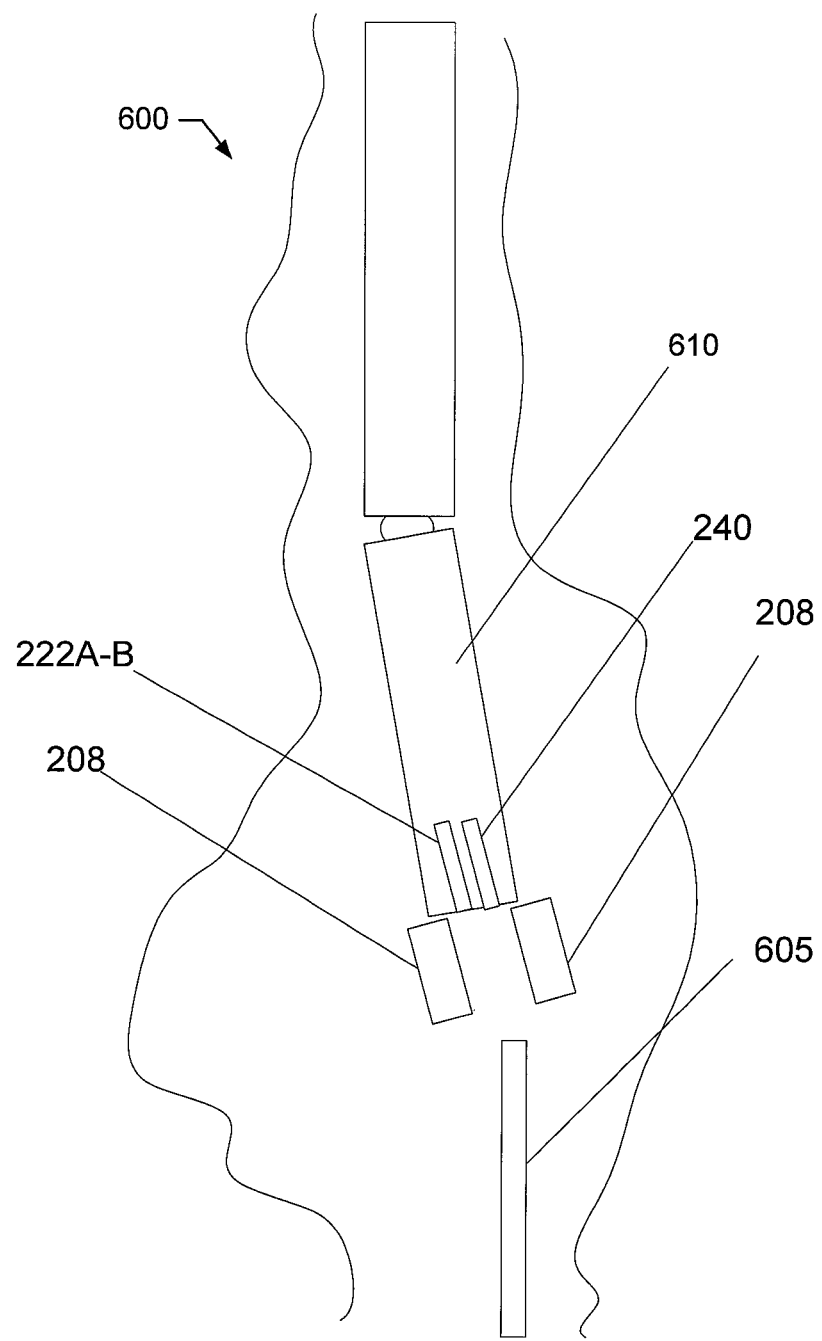
FIG. 6 is a block diagram illustrating an example object fishing tool that can be controlled remotely via the example imaging-based remote control systems disclosed herein.

A block diagram illustrating an example object fishing tool 600 that can be controlled remotely via the example imaging-based remote control systems disclosed herein is illustrated in FIG. 6. In oilfield scenarios, it can be difficult to retrieve a fallen object 605, also referred to as a "fish" 605, that has fallen into a cavity. However, by using optical-based remote control as disclosed herein, the example fishing tool 600 of FIG. 6 can use the example imaging systems 222A-B (in conjunction with other portions of the imaging assembly 204 as described above) to determine the orientation of the fish 605, and the shape of the fish 605 can also be detected and analyzed. In some examples, such as where the fish 605 is located inside opaque fluid (e.g., mud, etc), the flushing assembly 206, including the flushing nozzle 240 illustrated in FIG. 6, can be used to flush away the opaque fluid temporarily and capture image(s) of the fish 605 before the washed-away opaque fluid returns to the fields-of-view of the imaging systems 222A-B. Optical-based remote control as disclosed herein can then be used to control an example fishing actuator 610 (e.g., bent sub or overshoot) to align or grasp the fish 605.

Figure 7:
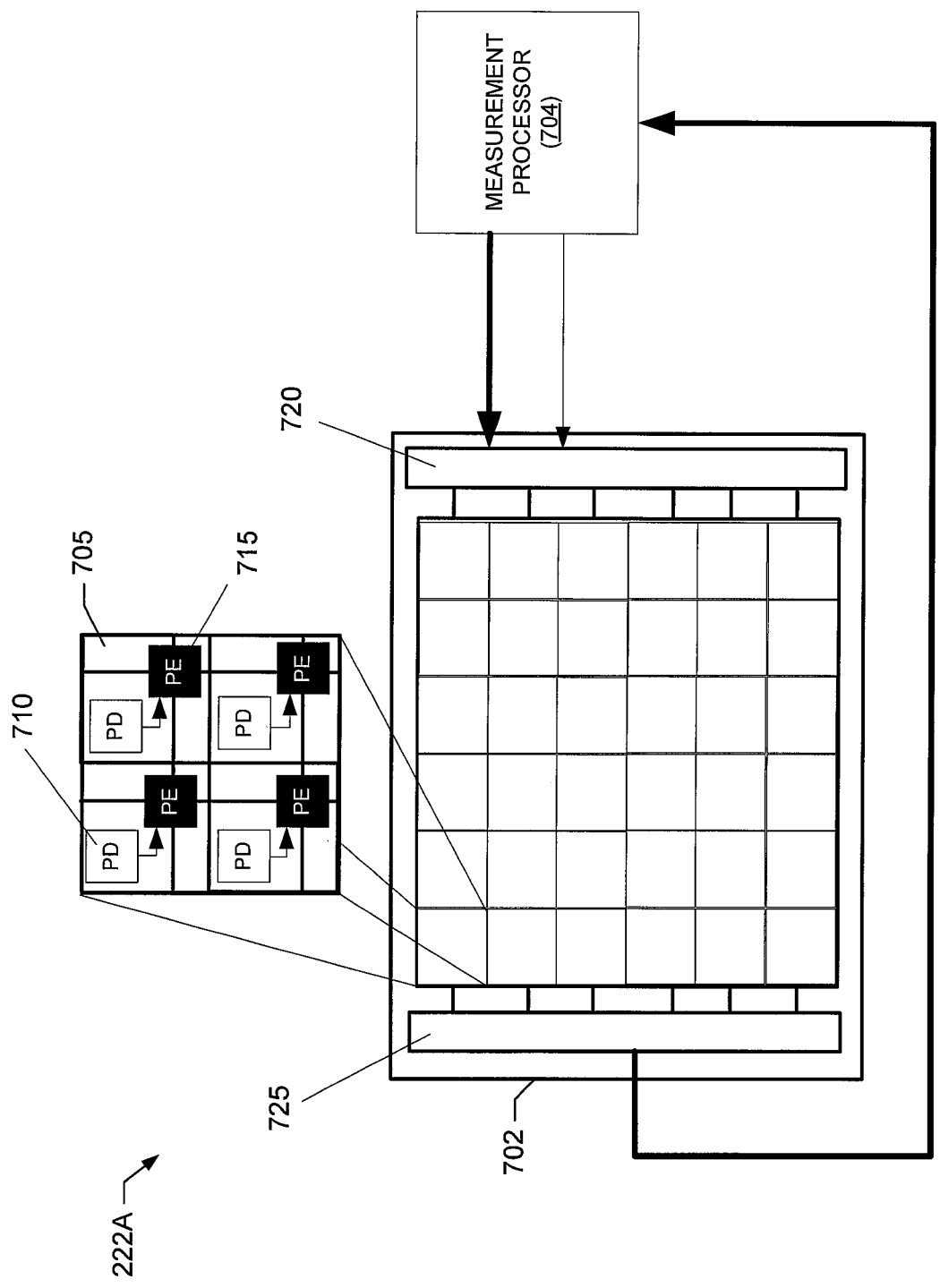
FIG. 7 illustrates an example imaging system including an example imaging processor and an example measurement processor that may be used to implement one or more of the imaging-based remote control systems of FIGS. 2-6.

FIG. 7 illustrates a first example implementation of the imaging system 222A described above. The illustrated example implementation of FIG. 7 can also used to implement the imaging system 222B described above. However, for convenience and without loss of generality, the example implementation of FIG. 7 is described from the perspective of implementing the imaging system 222A. In the example of FIG. 7, the imaging system 222A includes an example imaging processor 702 and an example measurement processor 704. For example, the imaging processor 704 can be used to implement each of the imaging devices 224A-B described above.

In the illustrated example of FIG. 7, the imaging processor 702 includes an array of pixel sensors 705. Each example pixel sensor 705 of the imaging processor 702 includes a respective example photo detector (PD) 710 and an associated example processing element (PE) 715. Each PD 710 of the illustrated example determines image data (e.g., such as intensity, color, etc.) for a respective portion (e.g., such as a respective pixel) of an image region (e.g., field-of-view) supported by the imaging processor 702 as defined by the array of pixel sensors 705. As such, the size of the array of pixel sensors 705 determines the image resolution that can be obtained by the imaging processor 702. For example, the array of pixel sensors 705 can be dimensioned to include X rows by Y columns of sensors, where X and Y are chosen to provide a desired image resolution. Examples of (X,Y) dimensions for the array of pixel sensors 705 include, but are not limited to, (100,100), (600,400), (800,600) (1024,768), etc., or any other appropriate pair of dimensions.

In the illustrated example, each PE 715 for each pixel sensor 705 of the imaging processor 702 includes an arithmetic and logic unit (ALU) and an internal memory. Additionally, the PE 715 in one cell is connected to and can communicate with the other PEs 715 (referred to herein as neighbor PEs) in the one or more (e.g., such as 4) adjacent, neighbor pixel sensors 705. In some examples, each PE 715 is able to perform arithmetic and logical operations on the image data obtained from the PD 710 in its own pixel sensor 705 and the image data obtained from the other PDs 710 (referred to herein as neighbor PDs 710) in the one or more (e.g., such as 4) adjacent, neighbor cells 705. In such an example, the PE 715 is connected to and can communicate with its own memory (e.g., which stores the image data from the PD 710 in its own cell 705) and the memories of the neighbor PEs 715 (e.g., which store the image data from the neighbor PDs 710).

In the illustrated example, each PE 715 for each pixel sensor 705 is programmable by the measurement processor 704 via any appropriate example decoder circuitry 720. For example, the measurement processor 704 can use the decoder circuitry 720 to send machine-readable instructions to one or more, or all, of the PEs 715. In some examples, the PEs 715 of the imaging processor 702 support parallel processing of the image data in their respective memories and neighbor memories, and the instructions can be single instruction multiple data (SIMD) instructions supporting such parallel processing. In the illustrated example, the processed image data resulting from the processing (e.g., parallel processing) performed by the PEs 715 can be read by or otherwise returned to the measurement processor 704 via any appropriate example output circuitry 725. Further examples of high speed imaging technologies that can be used to implement the imaging processor 702 are described in Masatoshi Ishikawa et al., "A CMOS Vision Chip with SIMD Processing Element Array for 1 ms Image Processing", *IEEE International Solid-State Circuits Conference (ISSCC* 1999), Dig. Tech. Papers, pp. 206-207, 1999, which is incorporated herein by reference in its entirety.

In an example operation of the imaging processor 702 and measurement processor 704 of FIG. 7, the measurement processor 704 uses the decoder circuitry 720 to program the PEs 715 of the pixel sensors 705 to cause the PDs 710 of the pixel sensors 705 to sense light in a field-of-view (e.g., to detect object(s) 210 and/or target(s) 315 in a remote environment). Each PD 710 processes the sensed light to determine image data, such as image intensity data, image color data, etc., for its respective portion of the image region (e.g., field-of-view) supported by the imaging processor 702. The image data determined by a particular PD 710 is stored in the memory of the respective PE 715 included in the same pixel sensor 705.

The measurement processor 704 then uses the decoder circuitry 720 to program each PE 715 for each pixel sensor 705 to process the image data stored in its memory (e.g., corresponding to the image data obtained from its associated PD 710) and the image data stored in the memories of the neighbor PEs 715 (e.g., corresponding to the image data obtained from the neighbor PDs 710) to determine object boundary information for one or more objects contained in the field-of-view. For example, the ALU of a particular PE 715 can perform operations, such as addition, subtraction, comparison, etc., to process the image data for its pixel sensor 705 and its neighbor pixel sensors 705 to determine whether the portion of the image region corresponding to the particular PE 715 is completely within or outside an object (e.g., of the image data for the entire neighborhood is substantially similar), or is at a boundary of the object (e.g., if the image data differs for different portions of neighborhood). In some examples, the boundary information can use a first value (e.g., 0) to represent pixels sensors determined to correspond to image regions completely within or outside an object, and a second value (e.g., 1) to represent pixel sensors determined to correspond to image regions at an object boundary.

After the PEs 715 determine the object boundary information by processing the image data for their respective neighborhoods, the measurement processor 704 uses the output circuitry 725 to read this object boundary information. The measurement processor 704 can then process the object boundary information to determine two-dimensional positioning data for object(s) in the currently configured field-of-view. For example, measurement processor 704 can use any appropriate image processing technique or techniques, such as edge detection, region growing, center of mass computation, etc., to process the object boundary information to determine the location(s) and size(s) of object(s) contained in the configured field-of-view of the imaging processor 702. Furthermore, the measurement processor 704 can count the number of objects detected in the field-of-view over time. In the illustrated example, the measurement processor 704 determines measurement data including, for example, coordinates (e.g., one, two or three dimensional coordinates) of the location(s) of object(s) detected in the field-of-view, size(s) of the object(s) detected in the field-of-view, number(s) of object(s) detected in the field-of-view (e.g., over time), etc. The measurement processor 704 then formats the measurement data for transmission to the surface (e.g., to the feedback processor 230 and/or the logging and control unit 140) via, for example, a telemetry communication link.

In some examples, the imaging processor 702 can provide a raw image formed from the image data obtained from each PD 710 to the measurement processor 704. In some examples, the measurement processor 704 may send the raw image, and even sequences of raw images (e.g., forming a video stream) to the surface (e.g., to the logging and control unit 140).

Figure 8:
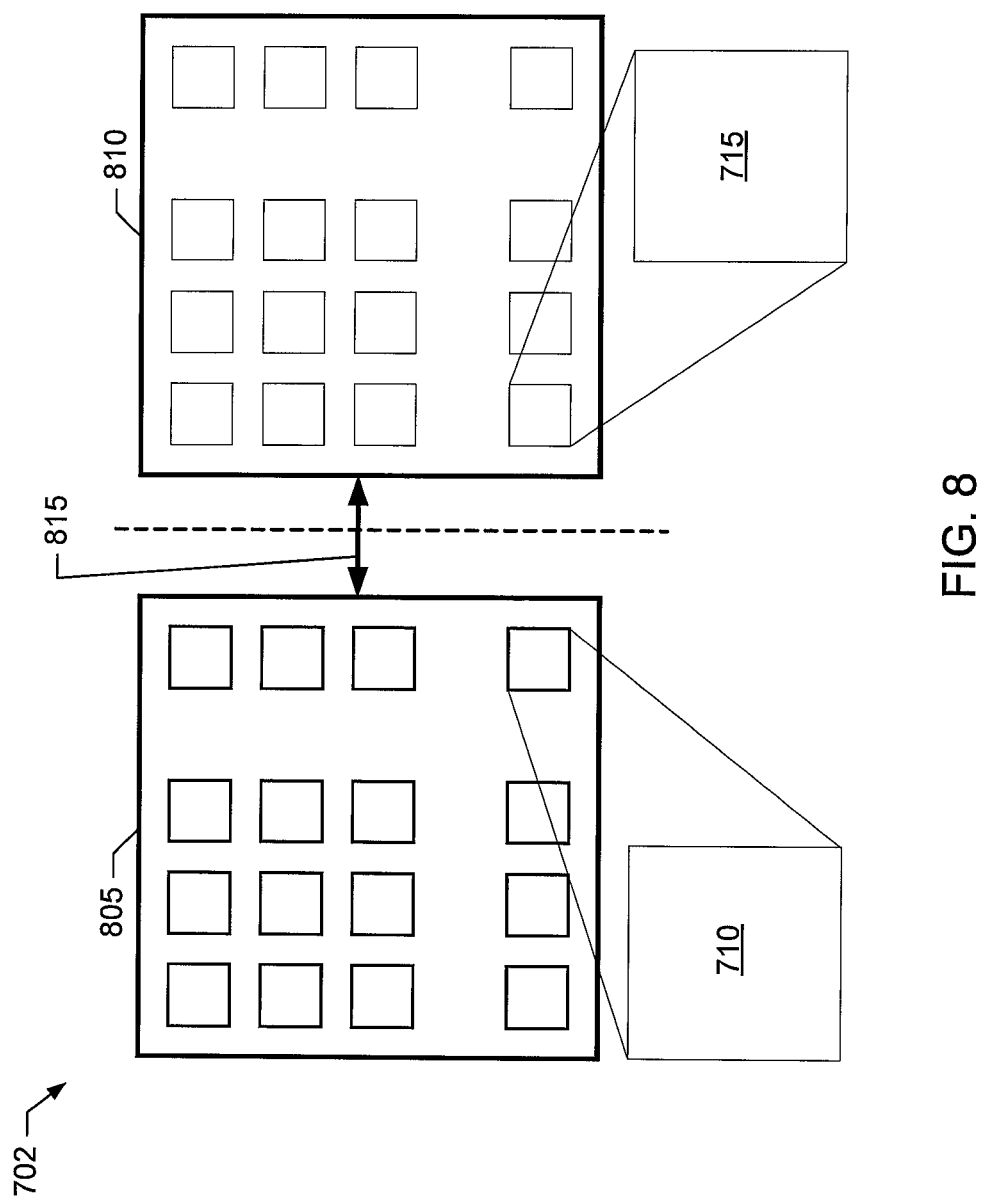
FIG. 8 illustrates an example implementation of the example imaging processor of FIG. 7.

A second example implementation of the imaging processor 702 of FIG. 7 is illustrated in FIG. 8. In the example of FIG. 8, the imaging processor 702 includes an example PD array chip 805 containing the PDs 710 for each pixel sensor 705, and a separate example PE array chip 810 containing the PEs 715 for each pixel sensor 705. The PD array chip 805 and the PE array chip 810 are interconnected via an example inter-chip communication link 815, which may be implemented by any type of communication circuitry, bus, etc. In the illustrated example, the PD array chip 805 and the PE array chip 810 are implemented using separate semiconductor devices. For example, the PD array chip 805 can be implemented by a semiconductor device containing complementary metal oxide semiconductor (CMOS) image sensors, and the PE array chip 810 can be implemented by a semiconductor device, such as a field programmable gate array (FPGA) and/or any other device capable of implementing the ALUs and memories making up the PEs 715 included in the PE array chip 810.

In the examples of FIGS. 7-8, the PDs 710 can be implemented using any type or combination of photonic sensors, such as optical sensors, electromagnetic sensors, etc. For example, the PDs can be implemented using CMOS-type photo detectors. As such, the PDs 710 can be used by the imaging processor 702 to detect and process objects in the field-of-view being measured. In some examples, the PDs 710 can include compensation circuitry to compensate for noise that occurs during high temperature operation.

Figure 9:
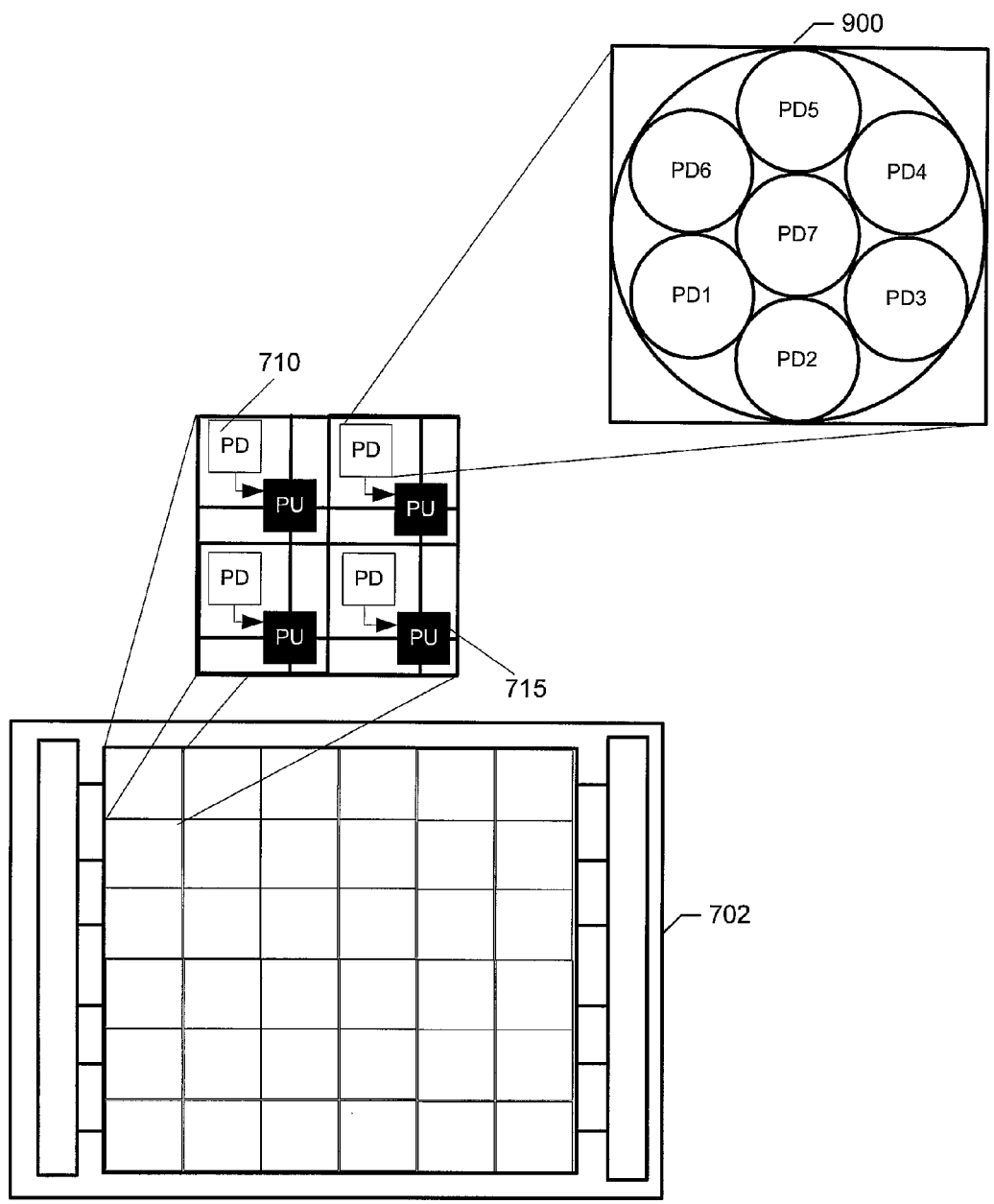
FIG. 9 illustrates an example photo detector that may be used to implement the imaging processors of FIGS. 7 and/or 8.
Figure 10:
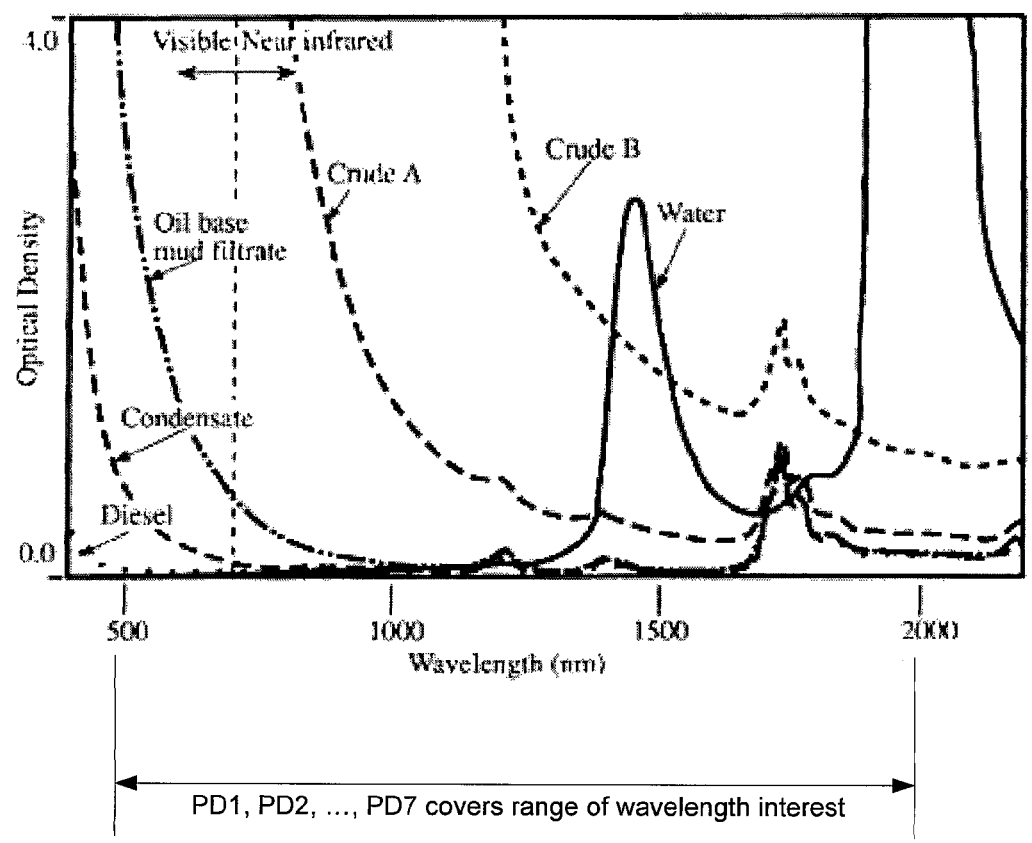
FIG. 10 illustrates example optical characteristics that can be sensed by the photo detector or FIG. 9.

FIG. 9 illustrates another example PD 900 that may be used to implement the PDs 710 included in the example imaging processors 702 of FIGS. 7 and/or 8. The example PD 900 of FIG. 9 includes multiple PD elements PD1-PD7 having different respective sensing characteristics. For example, the PD elements PD1-PD7 can correspond to multiple photo diodes or other photonic sensors having different light wavelength (e.g., color) sensitivities, as illustrated in FIG. 10. As illustrated in FIG. 10, the PD elements PD1-PD7 implementing the PD 900 can be chosen to cover a range of wavelengths of interest based on the type(s) of object(s) 210 and/or target(s) 315 to be detected. Although seven PD elements PD1-PD7 are illustrated in the example of FIG. 9, the PD 900 can include more or fewer PD elements as appropriate for a particular implementation.

In some examples, the imaging processor 702 can include one or more light magnification devices (not shown) to boost light intensity provided to the PDs 710 and/or 900 described above. In some examples, the imaging processor 702 can include one or more filters to filter the light provided to the PDs 710 and/or 900. In some examples, such filtering is uniform for all PDs 710 and/or 900 of the imaging processor 702. However, in other examples, such as in the context of the example PD 900 of FIG. 9, different filters can be used for the different PD elements PD1-PD7 implementing the PD 900. For example, each PD element PD1-PD7 may have a respective filter having filter characteristics to pass a range of wavelengths matching the wavelength sensitivity of the particular PD element PD1-PD7. In some examples, the imaging processor 702 can additionally include a grating device to be used with the filter(s) that are to process the light provided to the PDs 710 and/or 900.

Other example techniques for implementing the imaging systems 222A-B are described in U.S. application Ser. No. 13/245,827, entitled "Imaging Methods and Systems for Downhole Fluid Analysis," which was filed on Sep. 26, 2011. U.S. application Ser. No. 13/245,827 is hereby incorporated by reference in its entirety.

While example manners of implementing the imaging-based remote control systems 200, 400 and 500A-B, and the object fishing tool 600, have been illustrated in FIGS. 2-10, one or more of the elements, processes and/or devices illustrated in FIGS. 2-10 may be combined, divided, re-arranged, omitted and/or implemented in any other way. Further, the example manipulator assembly 202, the example imaging assembly 204, the example flushing assembly 206, the example manipulation controller 212, the example imaging systems 222A-B, the example imaging devices 224A-B, the example feedback processor 230, the example main controller 234, the example telemetry front-end 235, the example imaging assembly controller 236, the example nozzle orientation controller 246, the example valve controller 248, the example telemetry communication link 415, the example imaging processor 702, the example measurement processor 704, the example PDs 710 and/or 900, the example PD elements PD1-PD7, the example PEs 715, the example decoder circuitry 720, the example output circuitry 725, the example PD array chip 805, the example PE array chip 810, the example inter-chip communication link 815 and/or, more generally, the example imaging-based remote control systems 200, 400 and/or 500A-B, and/or the example object fishing tool 600 may be implemented by hardware, software, firmware and/or any combination of hardware, software and/or firmware. Thus, for example, any of the example manipulator assembly 202, the example imaging assembly 204, the example flushing assembly 206, the example manipulation controller 212, the example imaging systems 222A-B, the example imaging devices 224A-B, the example feedback processor 230, the example main controller 234, the example telemetry front-end 235, the example imaging assembly controller 236, the example nozzle orientation controller 246, the example valve controller 248, the example telemetry communication link 415, the example imaging processor 702, the example measurement processor 704, the example PDs 710 and/or 900, the example PD elements PD1-PD7, the example PEs 715, the example decoder circuitry 720, the example output circuitry 725, the example PD array chip 805, the example PE array chip 810, the example inter-chip communication link 815 and/or, more generally, the example imaging-based remote control systems 200, 400 and/or 500A-B, and/or the example object fishing tool 600 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example imaging-based remote control systems 200, 400 and/or 500A-B, the example object fishing tool 600, the example manipulator assembly 202, the example imaging assembly 204, the example flushing assembly 206, the example manipulation controller 212, the example imaging systems 222A-B, the example imaging devices 224A-B, the example feedback processor 230, the example main controller 234, the example telemetry front-end 235, the example imaging assembly controller 236, the example nozzle orientation controller 246, the example valve controller 248, the example telemetry communication link 415, the example imaging processor 702, the example measurement processor 704, the example PDs 710 and/or 900, the example PD elements PD1-PD7, the example PEs 715, the example decoder circuitry 720, the example output circuitry 725, the example PD array chip 805, the example PE array chip 810 and/or the example inter-chip communication link 815 are hereby expressly defined to include a tangible computer readable medium such as a memory, digital versatile disk (DVD), compact disk (CD), etc., storing such software and/or firmware. Further still, the example imaging-based remote control systems 200, 400 and/or 500A-B, and/or the example object fishing tool 600 may include one or more elements, processes and/or devices in addition to, or instead of, those illustrated in FIGS. 2-10, and/or may include more than one of any or all of the illustrated elements, processes and devices.

Flowcharts representative of example processes that may be executed to implement the example imaging-based remote control systems 200, 400 and/or 500A-B, the example object fishing tool 600, the example manipulator assembly 202, the example imaging assembly 204, the example flushing assembly 206, the example manipulation controller 212, the example imaging systems 222A-B, the example imaging devices 224A-B, the example feedback processor 230, the example main controller 234, the example telemetry front-end 235, the example imaging assembly controller 236, the example nozzle orientation controller 246, the example valve controller 248, the example telemetry communication link 415, the example imaging processor 702, the example measurement processor 704, the example PDs 710 and/or 900, the example PD elements PD1-PD7, the example PEs 715, the example decoder circuitry 720, the example output circuitry 725, the example PD array chip 805, the example PE array chip 810 and/or the example inter-chip communication link 815 are shown in FIGS. 11-15. In these examples, the process represented by each flowchart may be implemented by one or more programs comprising machine readable instructions for execution by a processor, such as the processor 1612 shown in the example processing system 1600 discussed below in connection with FIG. 16. In some examples, the entire program or programs and/or portions thereof implementing one or more of the processes represented by the flowcharts of FIGS. 11-15 could be executed by a device other than the processor 1612 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 11-15, or one or more portion(s) thereof, may be implemented manually. Further, although the example processes are described with reference to the flowcharts illustrated in FIGS. 11-15, many other techniques for implementing the example methods and apparatus described herein may be used. For example, with reference to the flowcharts illustrated in FIGS. 11-15, the order of execution of the blocks may be changed, and/or some of the blocks described may be changed, omitted, combined and/or subdivided into multiple blocks.

As mentioned above, the example processes of FIGS. 11-15 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. The example processes of FIGS. 11-15 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 11:
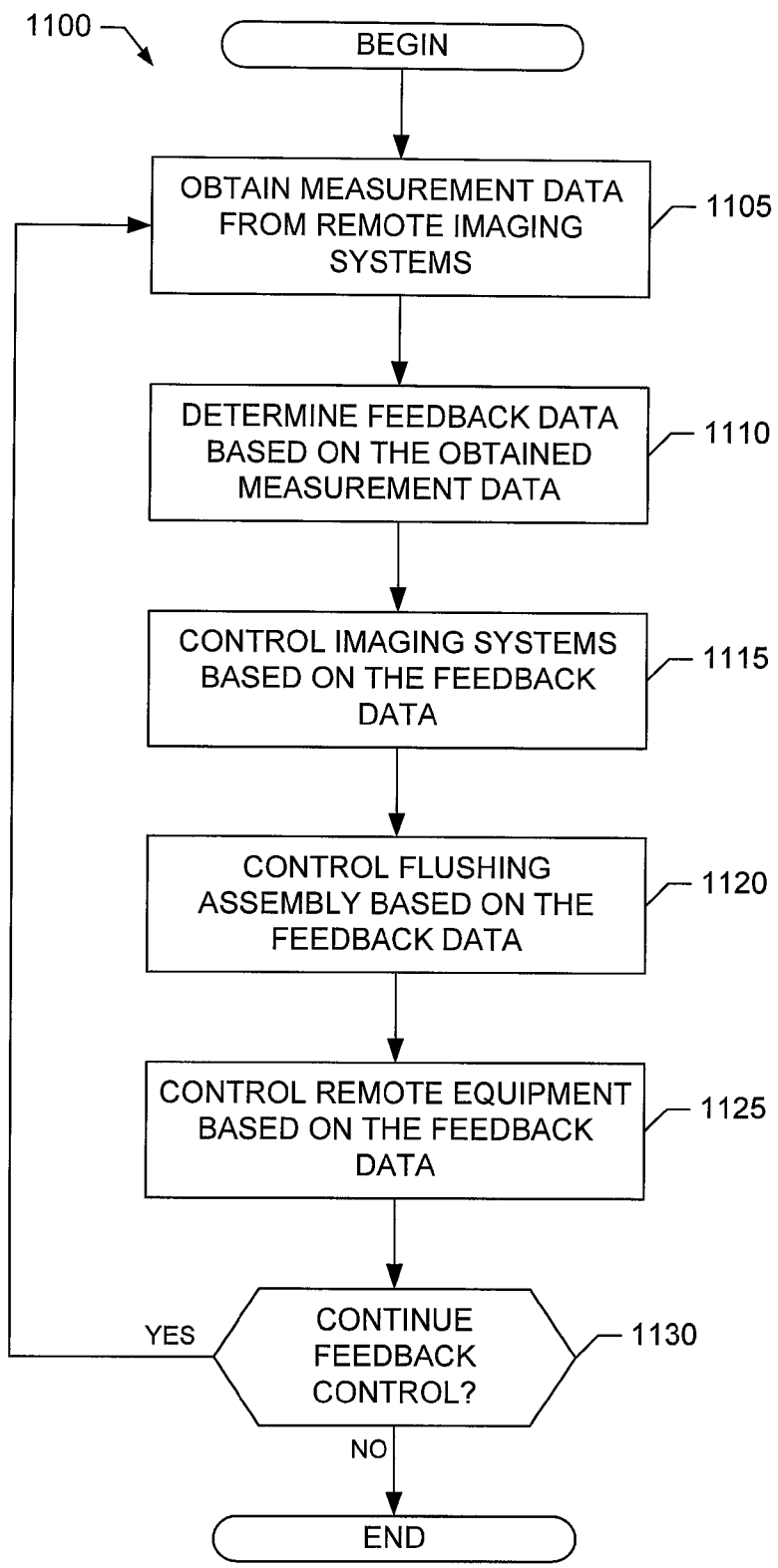
FIG. 11 is a flowchart representative of an example process that may be performed to implement one or more of the imaging-based remote control systems of FIGS. 2-6.

An example process 1100 that may be executed to implement one or more of the example imaging-based remote control systems 200, 400 and 500A-B of FIGS. 2, 4A-B and/or 5A-B, and/or the object fishing tool 600 of FIG. 6, is illustrated in FIG. 11. For convenience, and without loss of generality, operation of the example process 1200 is described primarily in the context of execution by the imaging-based remote control systems 200 of FIG. 2. With reference to the preceding figures and associated descriptions, the process 1100 begins execution at block 1105 at which the feedback processor 230 obtains respective measurement data from the imaging systems 222A-B of the imaging assembly 204, as described above. At block 1110, the feedback processor 230 of the imaging assembly 204 processes the measurement data obtained at block 1105 to determine feedback data for inclusion in the feedback signal(s) 232. For example, the measurement data obtained at block 1105 may include two-dimensional positioning data for object(s) 210 and/or target(s) 315 included in the fields-of-view of the imaging systems 222A-B, and also timing data indicating when the imaging systems 222A-B are to capture images of the for object(s) 210 and/or target(s) 315. In such an example, the feedback data determined at block 1110 can include the timing data, and also three-dimensional positioning data determined by combining the two-dimensional positioning data, as described above At block 1115, the imaging assembly controller 236 of the imaging assembly 204 implements feedback control, using the feedback data determined at block 1110, to control operation (e.g., the orientation and/or other positioning) of the imaging systems 222A-B and, thus, their respective fields-of-view, as described above. At block 1120, the main controller 234 implements feedback control (in conjunction with the nozzle orientation controller 246 and the valve controller 248 of the flushing assembly 206), using the feedback data determined at block 1110, to control operation (e.g., the positioning and/or timing) of the flushing fluid projected by the flushing assembly 206, as described above. At block 1120, the main controller 234 implements feedback control (in conjunction with the manipulation controller 212), using the feedback data determined at block 1110, to control operation of the manipulator assembly 202, as described above.

At block 1130, the imaging-based remote control systems 200 determines whether feedback control of the manipulator assembly 202, the example imaging assembly 204 and/or the example flushing assembly 206 is to continue. If feedback control is to continue (block 1130), the processing returns to block 1105 and blocks subsequent thereto. However, if feedback control is not to continue (block 1130), execution of the example process 1100 ends.

Figure 12:
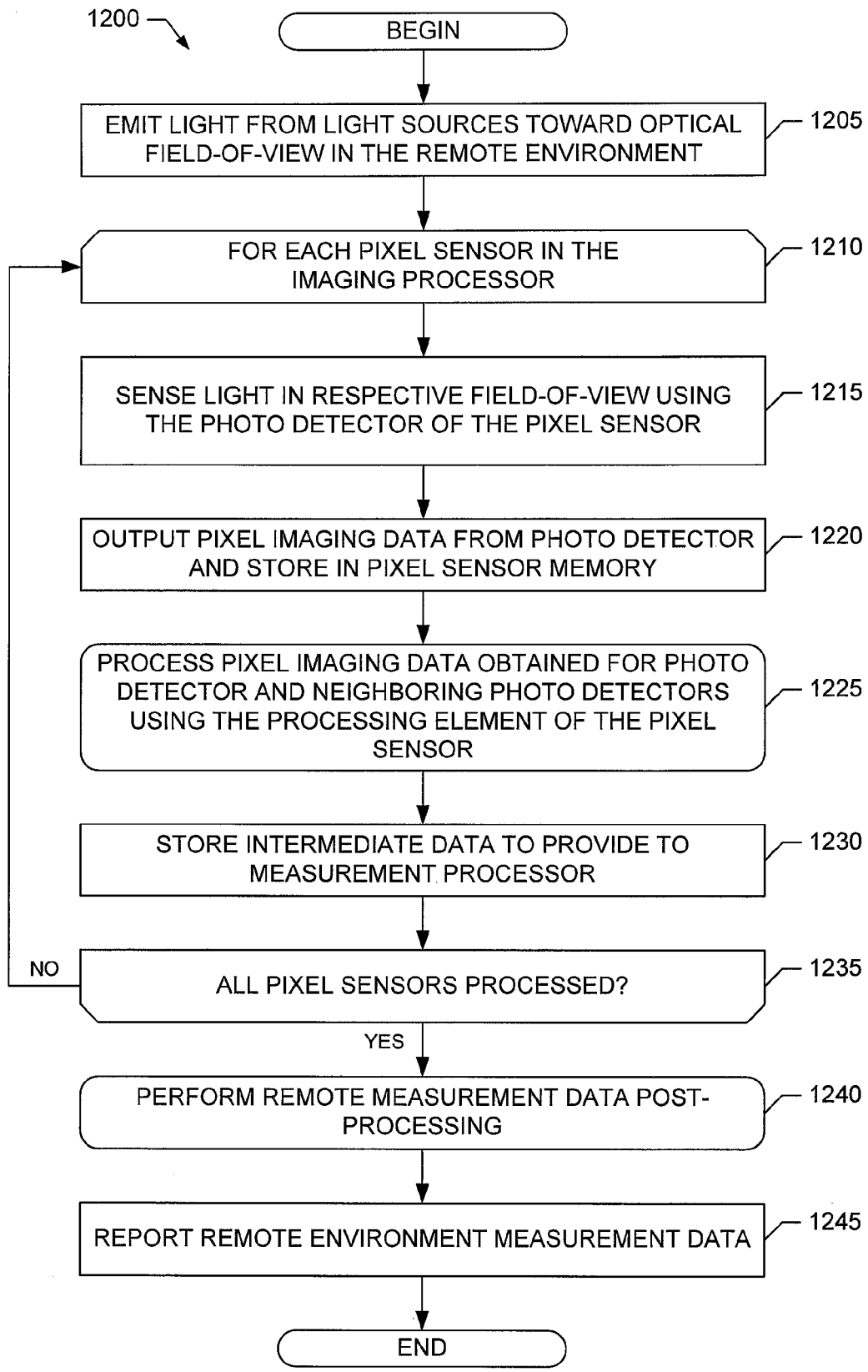
FIG. 12 is a flowchart representative of an example process that may be performed to determine measurement data in the example imaging system of FIGS. 7 and/or 8, and/or in the example process of FIG. 11.

An example process 1200 that may be executed to implement one or more of the example imaging systems 222A-B is illustrated in FIG. 12. For convenience, and without loss of generality, operation of the example process 1200 is described in the context of execution by the imaging system 222A. With reference to the preceding figures and associated descriptions, the process 1200 of FIG. 12 begins execution at block 1205 at which the light sources 226A of the imaging system 222A emit light that is to contact (e.g., and pass-through and/or be reflected by) object(s) 210 and/or target(s) 315 in the field-of-view of the imaging system 222A.

Next, at block 1210, each pixel sensor 705 in the imaging processor 702 of the imaging system 222A operates as follows. At block 1215, the PD 710 in each pixel sensor 705 is to sense the light emitted at block 1205 in the field-of-view. At block 1220, the PD 710 of each pixel sensor 705 outputs image data (e.g., intensity, color, etc.) based on the sensed light and stores the image data in the memory of the respective PE 715 associated with the particular PD 710. At block 1225, the PE 715 of each pixel sensor 705 processes the image data obtained by its associated PD 710 and its adjacent neighbor PDs 710, as described above. For example, at block 1225, the PE 715 of each pixel sensor 705 can determine object boundary information for its portion of the image region (e.g., field-of-view) supported by the imaging system 222A by processing the image data obtained from its memory and the memories of its neighbor pixel sensors 705, as described above. At block 1230, the imaging processor 702 stores the intermediate data determined by the PE 715 of each pixel sensor 705 for retrieval by the measurement processor 704 of the imaging system 222A. At block 1235, processing continues until all pixel sensors 705 have completed their respective processing. Although the processing performed by blocks 1210-1235 is depicted as being serial processing in the example of FIG. 13, the processing performed by blocks 1210-1235 can be parallel processing, as described above, or a combination of parallel and serial processing.

At block 1240, the measurement processor 704 of the imaging system 222A retrieves the intermediate data determined by the imaging processor 702 and post-processes the intermediate data to determine imaging measurement data. For example, the measurement processor 704 can process object boundary intermediate data determined by the imaging processor 702 to determine two-dimensional positioning data describing location(s) and/or size(s) of object(s) 210 detecting in the field-of-view, number(s) of object(s) 210 in the field-of-view, etc., as described above. The measurement processor 704 can also format the resulting measurement data for transmission via a telemetry communication link to the feedback processor 230 and/or logging and control unit 140, as described above. At block 1245, the measurement processor 704 reports the measurement data determined at block 1240 to the feedback processor 230 and/or logging and control unit 140, as described above.

Figure 13:
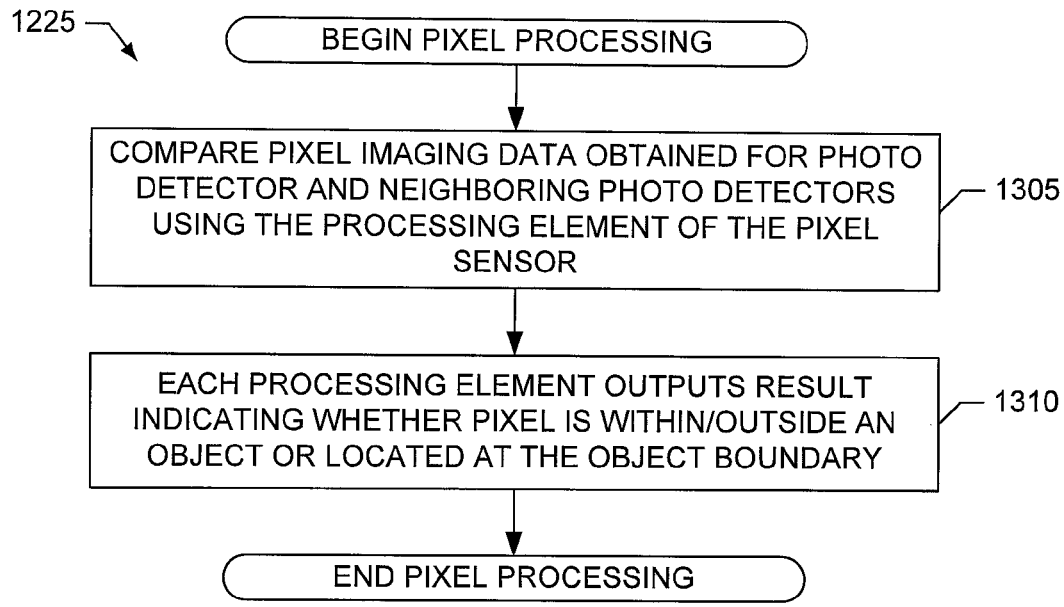
FIG. 13 is a flowchart representative of an example process that may be performed to implement pixel processing in the example imaging systems of FIGS. 7 and/or 8, and/or in the example process of FIG. 12.

An example process 1225 that can be used to implement the processing at block 1225 of FIG. 12 and/or pixel sensor processing in the imaging processor 702 is illustrated in FIG. 13. With reference to the preceding figures and associated descriptions, the process 1225 of FIG. 13 begins execution at block 1305 at which the PE 715 in each pixel sensor 705 of the imaging processor 702 compares image data obtained from its associated PD 710 with image data obtained from the PDs 710 of the adjacent neighbor pixel sensors 705. For example, if the PE 715 in a particular pixel sensor 705 determines that the image data obtained from its associated PD 710 is substantially similar to the image data obtained from the PDs 710 of the adjacent neighbor pixel sensors 705, then the PE 715 in the particular pixel sensor 705 can further determine that its pixel sensor 705 is associated with an image pixel that is either entirely within or outside an object 210 in the field-of-view being analyzed. However, if the PE 715 in a particular pixel sensor 705 determines that the image data obtained from its associated PD 710 is substantially different from image data obtained from the PDs 710 of one or more adjacent neighbor pixel sensors 705, then the PE 715 in the particular pixel sensor 705 can further determine that its pixel sensor 705 is associated with an image pixel that is at a boundary of an object 210 in the field-of-view being analyzed.

At block 1310, the PE 715 in each pixel sensor 705 outputs an intermediate result indicating whether the image pixel associated with the pixel sensor 705 is located at a boundary of an object, or the image pixel is located entirely within or outside an object (or, in other words, is not at a boundary of an object). For example, the PE 715 can use a first value to indicate that it is associated with an image pixel at an object boundary, and a second value to indicate that it is associated with an image pixel that is not at an object boundary.

Figure 14:
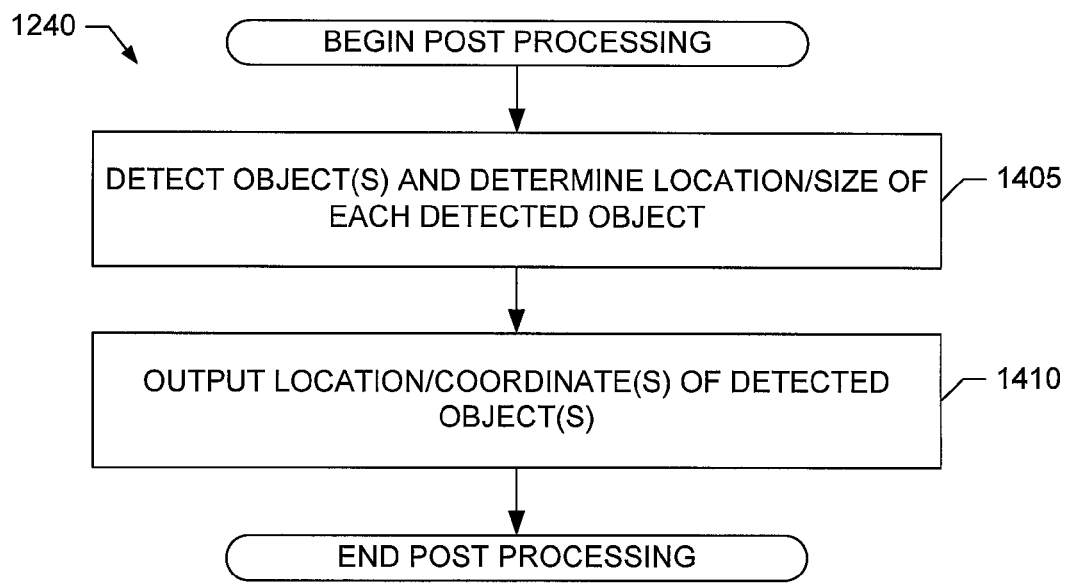
FIG. 14 is a flowchart representative of an example process that may be performed to implement post-processing in the example imaging systems of FIGS. 7 and/or 8, and/or in the example process of FIG. 12.

An example process 1240 that can be used to implement the processing at block 1240 of FIG. 12 and/or post-processing in the measurement processor 704 is illustrated in FIG. 14. With reference to the preceding figures and associated descriptions, the process 1240 of FIG. 14 begins execution at block 1405 at which the measurement processor 704 processes intermediate data (e.g., object boundary information) obtained from the imaging processor 702 to detect object(s) in the field-of-view being analyzed, and the location(s) and size(s) of the detected object(s), as described above. At block 1410, the measurement processor 704 outputs two-dimensional measurement data based on the object location information determined at block 1705. For example, and as described above, the measurement processor 704 can provide the two-dimensional measurement data to the feedback processor 230 for use in determining three-dimensional positioning data for the object(s) 210 detected in the field-of-view being analyzed.

Figure 15:
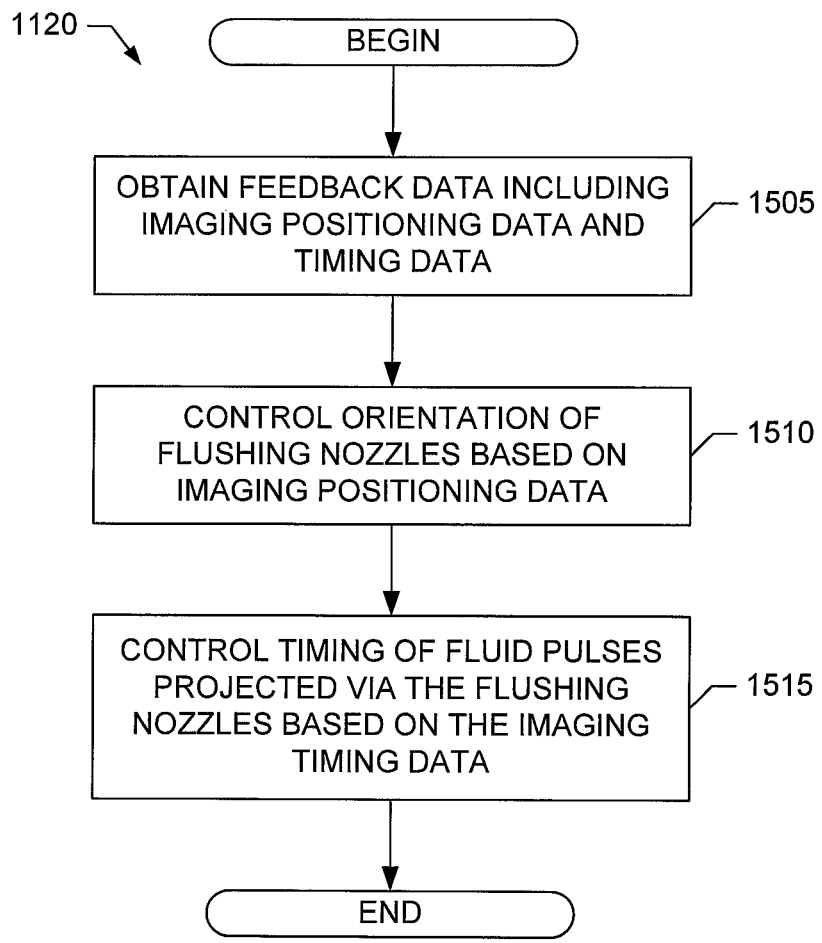
FIG. 15 is a flowchart representative of an example process that may be performed to control the example flushing assemblies of FIGS. 2 and/or 3, and/or to perform flushing assembly control in the example process of FIG. 11.

An example process 1120 that can be used to implement the flushing assembly 206 of FIG. 2 and/or processing at block 1120 of FIG. 11 is illustrated in FIG. 15. With reference to the preceding figures and associated descriptions, the process 1120 of FIG. 15 begins execution at block 1505 at which the main controller 234 obtains feedback data from the feedback processor 230 of the imaging assembly 204. The feedback data obtained at block 1505 includes three-dimensional positioning data for object(s) 210 and/or target(s) 315 detected by the imaging assembly 204. The feedback data obtained at block 1505 also includes timing data indicating when the imaging systems 222A-B of the imaging assembly 204 are to capture image(s) of the fields-of-view of the remote environment.

At block 1510, the main controller 234 processes the positioning data included in the feedback data obtained at block 1505 using any appropriate control loop processing to determine the control signal 252 to apply to the nozzle orientation controller 246 to control positioning (e.g., orientation) of the flushing nozzle 240, as described above. At block 1515, the main controller 234 processes the timing data included in the feedback data obtained at block 1505 using any appropriate control loop processing to determine the control signal 254 to apply to the flushing valve controller 248 to control the timing of opening and closing the valve 250 of the flushing assembly 206, as described above.

Figure 16:
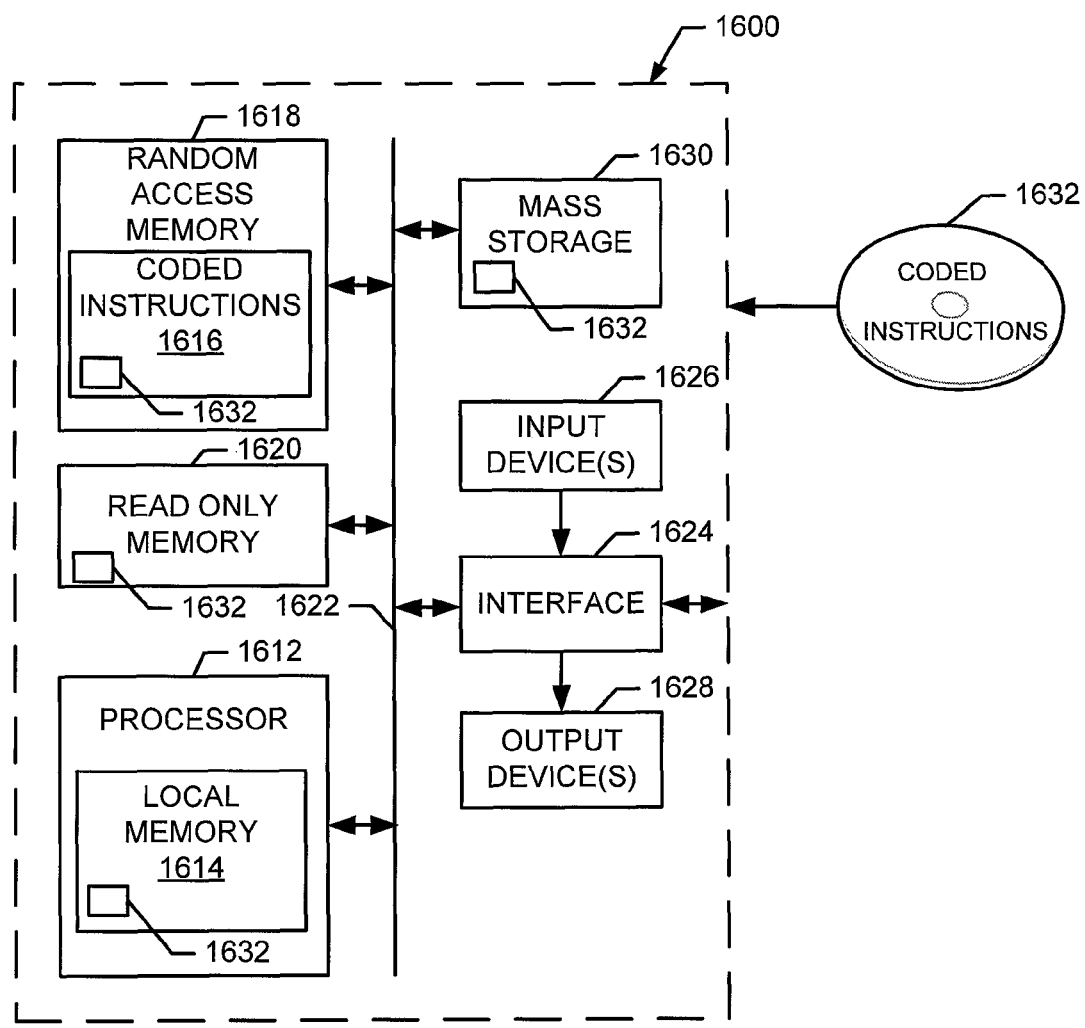
FIG. 16 is a block diagram of an example processing system that may execute example machine readable instructions used to implement one or more of the processes of FIGS. 11-14 and/or 15 to implement the example imaging-based remote control systems of FIGS. 2-6 and/or the example imaging system of FIGS. 7-8.

FIG. 16 is a block diagram of an example processing system 1600 capable of implementing the apparatus and methods disclosed herein. The processing system 1600 can be, for example, a smart controller, a special-purpose computing device, a server, a personal computer, a personal digital assistant (PDA), a smartphone, an Internet appliance, etc., or any other type of computing device.

The system 1600 of the instant example includes a processor 1612 such as a general purpose programmable processor. The processor 1612 includes a local memory 1614, and executes coded instructions 1616 present in the local memory 1614 and/or in another memory device. The processor 1612 may execute, among other things, machine readable instructions to implement the processes represented in FIGS. 11-15. The processor 1612 may be any type of processing unit, such as one or more Intel® microprocessors from the Pentium® family, the Itanium® family and/or the XScale® family, one or more microcontrollers from the ARM® and/or PIC® families of microcontrollers, one or more embedded soft/hard processors in one or more FPGAs, etc. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 may be controlled by a memory controller (not shown).

The processing system 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, may include a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1600 also includes one or more mass storage devices 1630 for storing machine readable instructions and data. Examples of such mass storage devices 1630 include floppy disk drives, hard drive disks, compact disk drives and digital versatile disk (DVD) drives.

The coded instructions 1632 of FIGS. 11-15 may be stored in the mass storage device 1630, in the volatile memory 1618, in the non-volatile memory 1620, in the local memory 1614 and/or on a removable storage medium, such as a CD or DVD 1632.

As an alternative to implementing the methods and/or apparatus described herein in a system such as the processing system of FIG. 16, the methods and or apparatus described herein may be embedded in a structure such as a processor and/or an ASIC (application specific integrated circuit).

Although a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system to control equipment used in an oilfield environment, the system comprising:
    an imaging assembly to determine feedback data based on measurement data obtained from a plurality of remote imaging systems controllable to process different respective optical fields-of-view in the oilfield environment;
    a flushing assembly controllable to project fluid momentarily, when the remote imaging systems are capturing imaging data for the different respective optical fields-of-view, to clear the optical fields-of-view of obscuring fluid in the oilfield environment, the momentary projection of fluid being repeatable at times when the remote imaging systems are subsequently capturing imaging data, and the obscuring fluid flows back into the fields-of-view after the momentary projection of fluid; and
    a controller to process the feedback data to determine a control signal to control operation of at least one of (1) the plurality of remote imaging systems or (2) the flushing assembly.

2. A system as defined in claim 1 wherein the feedback data comprises three-dimensional positioning data, the measurement data comprises respective two-dimensional positioning data determined by each one of the remote imaging systems based on respective imaging data obtained for a respective optical field-of-view in the oilfield environment, and the imaging assembly includes a feedback processor to:
    receive the respective two-dimensional positioning data from each one of the remote imaging systems via a telemetry link; and
    process the respective two-dimensional positioning data to determine the three-dimensional positioning data.

3. A system as defined in claim 1 wherein a first one of the remote imaging systems comprises:
    an imaging device positionable to sense light in a first optical field-of-view in the oilfield environment;
    a light source positionable to illuminate the first optical field-of-view; and
    the controller is to control an orientation of at least one of the imaging device or the light source based on the feedback data.

4. A system as defined in claim 3 wherein the imaging device comprises a plurality of photo detectors to sense light in the first optical field-of-view, each photo detector to determine respective image data for a respective portion of an image region supported by the first one or the remote imaging systems, and the first one of the remote imaging systems further comprises:
    a plurality of processing elements, each processing element being associated with a respective photo detector and to process first image data obtained from the respective photo detector and second image data obtained from at least one neighbor photo detector to determine object boundary information for an object in the first field-of-view; and a measurement processor to determine location information for the object based on the object boundary information determined by the plurality of processing elements, the location information to be included in the measurement data.

5. A system as defined in claim 1 wherein the feedback data comprises positioning data and timing data, the timing data indicating times when the imaging systems are to capture respective imaging data corresponding to the respective optical fields-of-view, and the controller is to control orientation and timing of the fluid projected by the flushing assembly based on the feedback data.

6. A system as defined in claim 1 wherein the optical fields-of-view contain an opaque fluid, and the fluid projected by the flushing assembly comprises a substantially transparent fluid.

7. A system as defined in claim 1 wherein the substantially transparent fluid is at least one of:
pumped to the oilfield environment via coiled tubing;
pumped to the oilfield environment via a drilling pipe;
obtained locally at the oilfield environment via filtering of at least one of drilling fluid, completion fluid or production fluid; or
obtained locally at the oilfield environment via separation of the substantially transparent fluid from at least one of drilling fluid, completion fluid or production fluid.

8. A system as defined in claim 1 wherein the substantially transparent fluid comprises at least one of water, nitrogen or oxygen.

9. A system as defined in claim 1 further comprising a manipulator assembly including:
a manipulator to manipulate an object in the optical fields-of-view in the oilfield environment; and
a manipulation controller operatively coupled to the manipulator, the manipulation controller to control the manipulator based on the feedback data.

10. A system as defined in claim 9 wherein the manipulator is included in a logging tool to install a shield at an unproductive reservoir layer.

11. A system as defined in claim 10 wherein the manipulator includes a tool to install the shield via at least one of welding or a mechanical fastener.

12. A system as defined in claim 9 wherein the manipulator is included in a logging tool to select a drilling cut to be conveyed via drilling fluid to a surface site.

13. A system as defined in claim 1 further comprising a robotic vehicle controller to control a robotic vehicle based on the feedback data.

14. A method to control equipment in an oilfield environment, the method comprising:
determining feedback data based on measurement data obtained from a plurality of remote imaging systems controllable to process different respective optical fields-of-view in the oilfield environment;
projecting fluid momentarily via a controllable flushing assembly to clear the optical fields-of-view of obscuring fluid in the oilfield environment during a time when the imaging systems are capturing imaging data for the different respective optical fields-of-view, and the obscuring fluid flowing back into the fields-of-view after the momentary projection of fluid;
repeating the momentary projecting of fluid at subsequent times when the remote imaging systems are capturing imaging data; and
processing the feedback data to determine a control signal to control operation of at least one of (1) the plurality of remote imaging systems or (2) the flushing assembly.

15. A method as defined in claim 14 wherein the feedback data comprises three-dimensional positioning data, the measurement data comprises respective two-dimensional positioning data determined by each one of the remote imaging systems based on respective imaging data obtained for a respective optical field-of-view in the oilfield environment, and the method further comprises:
receiving the respective two-dimensional positioning data from each one of the remote imaging systems via a telemetry link; and
processing the respective two-dimensional positioning data to determine the three-dimensional positioning data.

16. A method as defined in claim 14 wherein a first one of the remote imaging systems comprises an imaging device positionable to sense light in a first optical field-of-view in the oilfield environment, and a light source positionable to illuminate the first optical field-of-view, and the method further comprises controlling an orientation of at least one of the imaging device or the light source based on the feedback data.

17. A method as defined in claim 16 wherein the imaging device comprises a plurality of photo detectors to sense light in the first optical field-of-view, each photo detector to determine respective image data for a respective portion of an image region supported by the first one of the imaging systems, and the method further comprises:
processing the image data determined by the plurality of photo detectors using a plurality of processing elements to determine object boundary information for an object in the first field-of-view, each processing element being associated with a respective photo detector and to process first image data obtained from the respective photo detector and second image data obtained from at least one neighbor photo detector; and
determining location information for the object based on the object boundary information determined by the plurality of processing elements, the location information to be included in the measurement data.

18. A method as defined in claim 16 wherein the feedback data comprises positioning data and timing data, the timing data indicating times when the imaging systems are to capture respective imaging data corresponding to the respective optical fields-of-view, and the method further comprises controlling orientation and timing of the fluid projected by the flushing assembly based on the feedback data.

19. A method as defined in claim 16 further comprising controlling a manipulator based on the feedback data, the manipulator to manipulate an object in the optical fields-of-view in the oilfield environment.

* * * * *

UNITED STATES PATENT AND TRADEMARK OFFICE
CERTIFICATE OF CORRECTION

PATENT NO. : 9,584,711 B2
APPLICATION NO. : 13/439824
DATED : February 28, 2017
INVENTOR(S) : Theodorus Tjhang and Masatoshi Ishikawa Page 1 of 1

It is certified that error appears in the above-identified patent and that said Letters Patent is hereby corrected as shown below:

On the Title Page

Item (73) Assignees should read:
SCHLUMBERGER TECHNOLOGY CORPORATION, SUGAR LAND, TX
THE UNIVERSITY OF TOKYO, TOKYO, JAPAN Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*